United States Patent
Spiering et al.

(10) Patent No.: US 6,698,800 B2
(45) Date of Patent: Mar. 2, 2004

(54) REMOTE CONNECTOR INCLUDING SUPPORT STRUCTURE

(75) Inventors: Michael W. Spiering, Kingwood, TX (US); Richard L. Ahlgrim, Houston, TX (US); Bruce E. Morris, Houston, TX (US)

(73) Assignee: Oil States Industries, Inc., TX (US)

( * ) Notice: Subject to any disclaimer, the term of this patent is extended or adjusted under 35 U.S.C. 154(b) by 111 days.

(21) Appl. No.: 10/067,095

(22) Filed: Oct. 23, 2001

(65) Prior Publication Data

US 2002/0079693 A1 Jun. 27, 2002

Related U.S. Application Data

(63) Continuation of application No. 09/272,663, filed on Mar. 18, 1999, now Pat. No. 6,305,720.

(51) Int. Cl.$^7$ ................................................. F16L 35/00
(52) U.S. Cl. .................. 285/261; 285/920; 285/917; 285/334.2; 285/271; 285/406
(58) Field of Search ................................ 285/261, 271, 285/920, 334.2, 917, 406

(56) References Cited

U.S. PATENT DOCUMENTS

| | | | | |
|---|---|---|---|---|
| 3,383,122 A | | 5/1968 | Richardson | 285/261 |
| 3,450,421 A | * | 6/1969 | Harwell | 285/24 |
| 3,492,027 A | * | 1/1970 | Herring | 285/18 |
| 3,695,633 A | * | 10/1972 | Hanes | 285/18 |
| 3,860,271 A | | 1/1975 | Rodgers | 285/97 |
| 3,874,706 A | * | 4/1975 | Arnold | 285/24 |
| 3,997,197 A | | 12/1976 | Marsh et al. | 282/93 |
| 4,005,881 A | | 2/1977 | Burton et al. | 285/111 |
| 4,040,650 A | | 8/1977 | Shotbolt | 285/18 |
| 4,045,054 A | | 8/1977 | Arnold | 285/18 |
| 4,139,221 A | | 2/1979 | Shotbolt | 285/18 |
| 4,153,281 A | | 5/1979 | Ahlstone | 285/167 |
| 4,180,285 A | * | 12/1979 | Reneau | 285/261 |
| 4,381,871 A | | 5/1983 | Dopyera et al. | 285/261 |
| 4,477,105 A | | 10/1984 | Wittman et al. | 285/18 |
| 4,486,037 A | | 12/1984 | Shotbolt | 285/261 |
| 4,530,526 A | | 7/1985 | Dopyera et al. | 285/261 |
| 4,618,173 A | | 10/1986 | Dopyera et al. | 285/261 |
| 4,632,432 A | * | 12/1986 | Reneau | 285/24 |
| 4,708,376 A | * | 11/1987 | Jennings et al. | 285/315 |
| 4,886,300 A | | 12/1989 | Spiering et al. | 285/26 |
| 4,998,453 A | | 3/1991 | Walton et al. | 81/57.38 |
| 5,282,655 A | | 2/1994 | Marietta | 285/315 |
| 5,395,183 A | * | 3/1995 | Watkins | 405/195.1 |
| 5,468,023 A | | 11/1995 | Galle et al. | 285/24 |
| 5,471,739 A | | 12/1995 | Fetzer | 29/705 |
| 5,690,458 A | | 11/1997 | Junkers | 411/432 |
| 6,003,604 A | | 12/1999 | Wilkins | 166/366 |
| 6,113,157 A | * | 9/2000 | Wilkins | 285/263 |
| 6,305,720 B1 | * | 10/2001 | Spiering et al. | 285/18 |

OTHER PUBLICATIONS

"The GSR Connector," ABB Vetco Gray, advertisement.
"The Graylock Metal–to–Metal Seal," http://www.graylock-.com, pp. default.htm, remote1.htm, superior.htm, ABB Vetco Gray,1996.
"Kvaerner Diverless Pull–In and Connection Systems," Kvaerner Energy, product brochure.

* cited by examiner

*Primary Examiner*—Eric K. Nicholson
(74) *Attorney, Agent, or Firm*—Howrey Simon Arnold & White LLP

(57) ABSTRACT

An articulating connector system including an active connector coupled to a first line and a hub assembly coupled to a second line. The active connector includes a swivel coupling element intermediate a grip and a ball nose to allow rotational and articulating motion. A seal is coupled to the ball nose and is protected and guided by an alignment lip into mating engagement with a sealing surface defined by the hub. A clamp closes about the swivel coupling element and hub to draw together the seal and sealing surface into sealing contact to connect the first line to the second line.

14 Claims, 19 Drawing Sheets

REMOTE CONNECTOR INCLUDING SUPPORT STRUCTURE

This is a continuation of application Ser. No. 09/272,663 filed Mar, 18, 1999 now U.S. Pat. No. 6,305,720.

BACKGROUND OF THE INVENTION

1. Field of the Invention

The present invention relates to a method and apparatus for connecting a first line to a second line. More particularly, this invention relates to a method and apparatus for connecting two or more lines using a remotely operable articulated connector.

2. Description of Related Art

In many industries, it is necessary to connect a first fluid-carrying or electrical line to a second line. In particular, the oil and gas industry regularly utilizes subsea pipelines that must be connected for the gathering and transportation of produced fluids.

There are several methods and devices currently used for connecting lines, and particularly, subsea lines. Methods known in the art include, for example, standard API or ANSI flanges. Alignment and installation of bolting may be performed using a diver or remote equipment. Tools that aid in the assembly of flanges may include alignment guides, modified bolts, or nut retainers. When a connection is made on relatively small pipes and in depths that are readily accessible by divers, the use of flanges has been historically acceptable. On larger pipes and in locations where accessibility becomes a problem for divers and intervention equipment, however, flanges become more difficult to use. Alignment of two flange halves is often time consuming and difficult. Engaging a nut on a bolt may be quite difficult in certain subsea environments. Manipulation and cross threading, which often present significant problems for divers, make many current remote connection techniques impractical.

One technique under development uses pipe handling frames to manipulate a pipe and to align flanges. Tooling must be included to install the sealing gasket and bolting. Examples of this equipment include the Sonsub Brutus system and the Stolt Comex Seaway Matis (Modular Advance Tie In System) System. Although these systems have shown some degree of utility, the equipment associated with this technique may be bulky and relatively difficult to deploy. A typical flanged connection system utilizing subsea rigging may have a length of about 32 feet, a height of about 8 feet, and a weight of about 38 thousand pounds. Mechanisms to install the bolting are usually located well inside the frames, and, therefore, access is often restricted to correct any problems with remote bolt manipulation.

Another technique uses a flanged connection system with a midline ball-and-socket type connector. Although this type of system introduces articulation into the pipe spool, the articulation exhibits significant drawbacks. Articulation at the midline location is often accompanied by X-Y translation at the point of connection. This may be additive to overall misalignment of the connection and may therefore create unwanted stresses near the connection point.

Another technique uses a DFCS (Diverless Flowline Connection System) flexible pipe connection system. This system incorporates a flexible hose. The use of the hose results in reduced stress at the point of connection compared to a rigid steel pipe. However, the hose is limited in use because of manufacturing limitations of size, collapse of the hose from the pressure in deep water, and incompatibility with some aggressive produced fluids that must be transported.

In addition to flange methods, there are other techniques for connecting two lines. One technique uses a clamp-type connector, and the clamp itself provides structural strength. The clamp may include two or more segments that may be drawn together with bolts. Some methods pre-assemble the bolts to avoid subsea assembly. The clamp engages two pipeline hubs, and the sealing is between the two hubs. Another method of engaging the hubs is to use a set of radially oriented collet fingers. The fingers may be rotated into position and provide the structural strength. A set of radially translated dogs may also be used as a locking mechanism. The hubs may be drawn together by the dogs in a manner similar to that of the collet fingers.

Although the above-noted techniques have demonstrated at least a degree of utility in connecting lines, significant room for improvement remains. For instance, such current techniques often require face-to-face contact, without angular misalignment, between lines in order for a successful connection to be made. Such required face-to-face contact means that subsea linear and angular measurements may become critical. For example, if a jumper spool is to be connected to two laterally spaced, upwardly facing pipelines, it is necessary to measure the linear distance between the two upwardly facing pipelines and precisely measure the angular orientations of those two pipelines before the connection may be made. Equipment for making such measurements, especially for making angular measurements, can be extremely costly and complicated, and the measurement process may add significantly to delays, thus further increasing costs in connecting lines. Further, errors in linear measurements may translate into angular errors during connection because angular flexing may be required to compensate for, for instance, a short or long jumper spool. Angular errors may significantly add to stresses occurring at a connection point. Such stresses may degrade a connection and may lead to a short product lifetime.

Other disadvantages may arise in current techniques due to the forces required to make a connection when misalignment is present. The determination of forces required to complete a connection is an integral part of the connector design process. During the installation of the connector, the application of force may be performed by bolting, clamping, collets, and dogs. The connection load is predetermined and is generally difficult to alter. In remote installations, the difficulty increases due to inaccessibility of the equipment. When a line and its final, intended location differ in linear and/or angular dimensions, there is additional unknown load that must be introduced to complete the connections. This is the load required to force the connections into alignment within the tolerance required for sealing. The misalignment may be a combined result of measurement error, pipe spool fabrication, gravitational, and thermal influences—regardless of the source of error, however, the additional load required to connect the misaligned lines increases the probability of an unsatisfactory connection.

Another potential for failure of a connection using current techniques relates to damage to a seal or sealing surface during installation. Because current alignment techniques typically use seal surfaces for alignment, the seal often bumps, for example, a flange of another line during pipeline alignment. Such bumping may scratch or otherwise damage the seal, leading to a faulty connection. This increases the potential for damage to seals and sealing surfaces. When sealing surfaces used for annulus testing are also used for alignment, damage may occur, which may cause the annulus test to fail.

Many current techniques rely upon divers to facilitate the connection process. However, as subsea pipelines are installed deeper, it may become difficult for divers to connect lines. Other techniques may be suitable for divers, but financial concerns may dictate that divers may not be used because of their high cost. Therefore, a technique that may connect lines without divers, but that is inexpensive enough so that divers may be used if wanted would be desirable.

In current deep water connections systems, one of the driving cost factors is the cost of the installation vessel and its ancillary costs. These costs often greatly exceed the cost of the connector. Many activities, including measurement and subsea pipe manipulation to force alignment, may require extensive vessel time. A technique that could reduce installation time would therefore be advantageous.

Problems pointed out in the foregoing are not intended to be exhaustive but rather are among many that tend to impair the effectiveness of previously known connection techniques. Other noteworthy problems may exist however, those presented above should be sufficient to demonstrate that previous techniques appearing in the art have not been altogether satisfactory, particularly in providing a method and apparatus for quickly and inexpensively connecting one or more lines despite some degree of angular misalignment and without using a seal for alignment functions.

SUMMARY OF THE INVENTION

In one respect, the invention is a connector apparatus for connecting a first line to a second line and includes a hub, a sealing surface, a swivel coupling element, a seal, an alignment lip, and a clamp. The hub is coupled to the second line. The sealing surface is coupled to the hub. The swivel coupling element is coupled to the first line. The seal is coupled to and configured in operative relation with the swivel coupling element. The alignment lip is coupled to the hub and is configured to protect the seal and to guide the seal into mating engagement with the sealing surface. The clamp is configured to close about the swivel coupling element and the hub to draw together the seal and the sealing surface into sealing contact to connect the first line to the second line.

In other aspects, the connector apparatus may also include a grip and a ball nose. The grip may be configured in operative relation with the swivel coupling element, and the ball nose may be coupled between the grip and the seal. The ball nose may be configured to engage the alignment lip. The swivel coupling element may be positioned intermediate the grip and the ball nose to allow rotational and articulating motion of the swivel coupling element relative to the first line. The rotational motion may be 360 degrees, and the articulating motion may be about twenty degrees or less relative to the first line. The connector apparatus may also include an annulus testing port defined in the ball nose. The connector apparatus may also include a soft landing body, an alignment cone, and a landing base. The soft landing body may be configured in operative relation to the seal. The alignment cone may be slidably coupled to the soft landing body. The landing base may be coupled to the second line and may be configured to receive the alignment cone. The alignment cone may be configured to align the seal with the sealing surface by passing over an outer surface of the hub. The soft landing body may be configured to slide in relation to the alignment cone to guide the seal into seating alignment with the sealing surface. The hub may include a clamping recess configured to mate with the clamp upon closure of the clamp. The sealing surface may be recessed. The seal may be a ribbed metal seal. The connector apparatus may also include one or more guide pins and one or more guide cones in operative relation with the seal. The one or more guide pins may be configured to engage the one or more guide cones to guide the first line towards the second line. The sealing surface may be defined by the hub. The alignment lip may be defined by the hub.

In another respect, the invention is an articulated connector component including a swivel coupling element, a grip, a ball nose, a seal, and a clamp. The grip is configured in operative relation with the swivel coupling element. The ball nose is coupled to the grip and is configured in operative relation with the swivel coupling element. The swivel coupling element is coupled in a position intermediate the grip and the ball nose to allow rotational and articulating motion of the swivel coupling element. The seal is coupled to the ball nose. The clamp is configured in operative relation with the seal and operable to close about the swivel coupling element.

In other aspects, the connector component may also include a soft landing body in operative relation with the seal and an alignment cone coupled to the soft landing body. The soft landing body may slidably engage the alignment cone. The connector component may also include a support structure coupled between the grip and the soft landing body and may be configured to support the clamp about the seal. The seal and the ball nose may be integral. The seal and the ball nose may make up a replaceable sealing unit. The seal may be a ribbed metal seal. The rotational motion may be 360 degrees and the articulating motion may be about twenty degrees or less relative to a longitudinal axis of the connector component. The clamp may include a plurality of segments. The clamp may include a remotely operable clamp actuator. The clamp may include at least one pair of opposing sides, and rotation of the clamp actuator may advance the pair of opposing sides to close about the swivel coupling element. The connector component may also include an annulus testing port configured in operative relation with the seal. The annulus testing port may be defined in the ball nose.

In another respect, the invention is an articulating connector system including an active connector and a hub assembly. The active connector includes a swivel coupling element, a grip, a ball nose, a seal, a clamp, a soft landing body, and an alignment cone. The hub assembly includes a hub, a sealing surface, an alignment lip, a clamping recess, and a landing base. The grip is configured in operative relation with the swivel coupling element. The ball nose is coupled to the grip and configured in operative relation with the swivel coupling element. The swivel coupling element is intermediate the grip and the ball nose to allow rotational and articulating motion of the swivel coupling element. The seal is coupled to the ball nose. The clamp is configured in operative relation with the seal and operable to close about the swivel coupling element. The soft landing body is configured in operative relation with the seal. The alignment cone is slidably coupled to the soft landing body. The hub is coupled to the second line. The sealing surface is defined by the hub. The alignment lip is defined by the hub and is configured to protect the seal and to guide the seal into mating engagement with the sealing surface. The clamping recess is defined by the hub and is configured to mate with the clamp upon closure of the clamp. The landing base is in operative relation with the hub and is configured to receive the alignment cone.

In other aspects, the active connector may also include a support structure coupled between the grip and the soft landing body. The support structure may be configured to slide the soft landing body relative to the alignment cone. The rotational motion may be 360 degrees and the articulating motion may be about twenty degrees or less. The seal may be a ribbed metal seal. The connector system may also include an annulus testing port coupled to the active connector and configured in operative relation with the seal. The ball nose and the seal may be integral.

In another respect, the invention is a method for connecting a first line to a second line. An active connector coupled to a the first line is provided. The active connector includes a swivel coupling element; a seal in operative relation with the swivel coupling element, a clamp configured in operative relation with the seal, a soft landing body configured in operative relation with the seal, and an alignment cone slidably coupled to the soft landing body. A hub assembly coupled to the second line is provided. The hub assembly includes a hub, a sealing surface, a clamping recess defined by the hub, and a landing base configured in operative relation to the hub. The active connector is positioned adjacent the hub assembly. The active connector is hard landed by passing the alignment cone over an outer surface of the hub to engage the landing base. The active connector is soft landed onto the hub assembly by sliding the soft landing body relative to the alignment cone in a direction toward the landing base. The seal is seated into mating engagement with the sealing surface. The clamp is activated to close about the swivel coupling element so as to draw together the seal and the sealing surface into sealing relationship to connect the first line to the second line.

In other aspects, a remotely operated vehicle may perform the positioning, the hard landing, the soft landing, the seating, the activating, or any combination thereof. The active connector may also include an annulus testing port configured in operative relation with the seal, and the method may also include annulus testing the seal.

In another respect, the invention is a method for connecting a first line to a second line. An active connector coupled to the first line is provided. The active connector includes a swivel coupling element; a grip configured in operative relation with the swivel coupling element; a ball nose coupled to the grip and configured in operative relation with the swivel coupling element; a seal coupled to the ball nose; a clamp configured in operative relation to the seal; an annulus testing port configured in operative relation to the seal; a soft landing body configured in operative relation to the seal; and an alignment cone slidably coupled to the soft landing body. A hub assembly coupled to the second line is provided. The hub assembly includes a hub; a sealing surface defined by the hub; an alignment lip defined by the hub; a clamping recess defined by the hub; and a landing base configured in operative relation to the hub. The active connector is positioned adjacent the hub assembly. The active connector is hard landed by passing the alignment cone over an outer surface of the hub to engage the landing base. The active connector is soft landed onto the hub assembly by sliding the soft landing body relative to the alignment cone in a direction toward the landing base. The seal is seated into mating engagement with the sealing surface with the alignment lip. The clamp is activated to close about the swivel coupling element. The clamping recess is mated with the clamp. The grip is mated with the clamp. The seal and the sealing surface are drawn together into sealing relationship to connect the first line to the second line.

In other aspects, the method may also include engaging the alignment lip with the ball nose. A remotely operated vehicle may perform the positioning, the hard landing, the soft landing, the seating, the activating, the mating the clamping recess, the mating the grip, the drawing together, or any combination thereof. The method may also include annulus testing the seal with the annulus testing port. A remotely operated vehicle may perform the annulus testing.

DESCRIPTION OF ILLUSTRATIVE EMBODIMENTS

Figure 1:
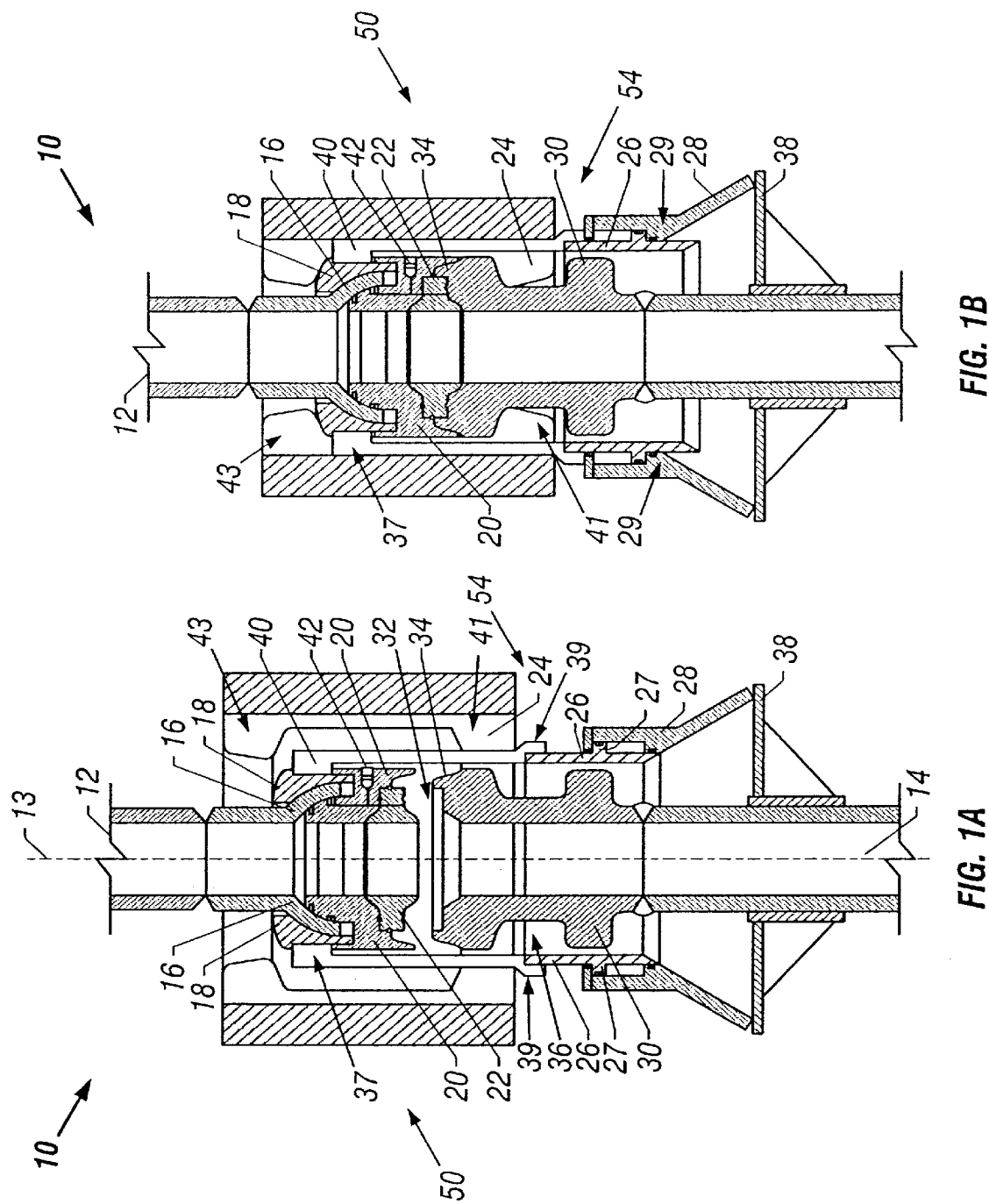
FIG. 1A is a cross sectional view of a connector apparatus with a clamp in an open position according to one embodiment of the presently disclosed method and apparatus.
FIG. 1B is a cross sectional view of a connector apparatus with a clamp in a closed position according to one embodiment of the presently disclosed method and apparatus.
Figure 2:
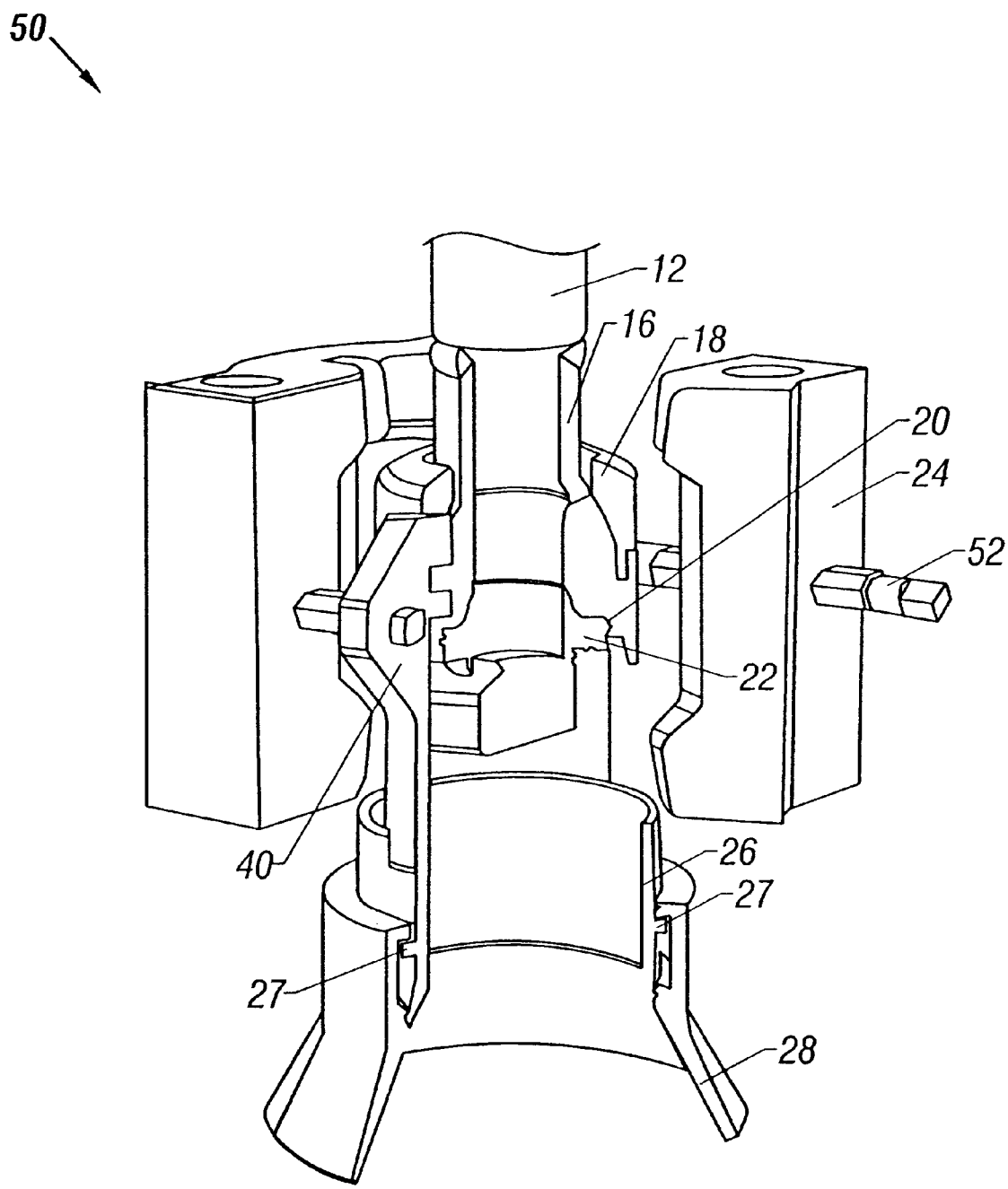
FIG. 2 is a three dimensional view of an active connector according to one embodiment of the presently disclosed method and apparatus.

It will be appreciated that the disclosed method and apparatus provide for certain significant advantages. For instance, the method and apparatus, by providing articulation at a connection point, allow for subsea pipeline connections that significantly reduce stress at that connection point. Additionally, the installation time necessary for connecting pipelines may be significantly reduced because, in part, angular subsea measurements between the subsea pipelines being connected become less critical due to the articulation achieved by the presently disclosed techniques. Subsea pipelines may be installed and connected with or without the assistance of a diver. More specifically, because the presently disclosed techniques may greatly reduce costs, the additional costs associated with divers may be acceptable. In other words, the presently disclosed technique makes using divers affordable, although divers are not required. The method and apparatus allow for pipeline connections despite a certain degree of angular misalignment. Further, the method and apparatus provide for a connection system that is self-aligning. Still further, seals of the presently disclosed apparatus do not perform alignment functions, and therefore the life of the apparatus may be increased considerably. Also, annulus testing may be incorporated in the apparatus, allowing for quick subsea testing of connections. The annulus testing provides cost savings, and because seals do not perform alignment, annulus testing may be more reliable.

Turning first to FIG. 1A, there is shown, in cross section, a remote articulated connector apparatus 10. Connector 10 includes a first line 12, a second line 14, a swivel coupling element 16, a grip 18, a ball nose 20, a seal 22, a clamp 24, a soft landing body 26, an alignment cone 28, a hub 30, a sealing surface 32, an alignment lip 34, an clamping recess 36, a landing base 38, a support structure 40, and an annulus testing port 42.

A portion of connector 10 may be termed an active connector 50. Active connector 50 includes swivel coupling element 16, grip 18, ball nose 20, seal 22, clamp 24 soft landing body 26, alignment cone 28, annulus testing port 42, and support structure 40. Another portion of connector 10, a portion designed to mate with active connector 50, may be termed a hub assembly 54. Hub assembly 54 includes hub 30, sealing surface 32, alignment lip 34, clamping recess 36, and landing base 38.

In one embodiment, connector 10 may serve to sealingly connect first line 12 to second line 14 by bringing together active connector 50 and hub assembly 54. In this regard, first line 12 and second line 14 may be any type or combination of types of lines. For instance, the lines may include, but are not limited to, jumper pipes, subsea pipes, production flowlines, risers, and in the repair of pipelines.

The size and construction of first lines 12 and 14 may conform with sizes and construction materials known in the art. For instance, in one configuration, first line 12 and second line 14 may have a diameter of nominally 4 inches, but in other embodiments may range from about 2 inches to about 40 inches. Again, those of skill in the art will understand that any size suitable for making connections may be substituted therewith.

In the illustrated embodiment, coupled to first line 12 may be swivel coupling element 16 that may allow for rotational and/or articulating motion so that first line 12 may be connected to line 14 despite a certain degree of misalignment between lines 12 and 14. Although here illustrated as an articulated ball connector, BIMS Ball Flange connector, with benefit of this description swivel coupling element 16 may be any device suitable to provide a connection of two or more lines despite a certain degree of misalignment. For instance, in other embodiments, Hydrotech Misalignment Flange, Cameron Swivel Ball, or Securmax Flexiball may be used. The size of swivel coupling element 16 may vary widely depending on, for instance, the size of first and second lines 12 and 14. The size of the swivel coupling may generally match the size of the lines.

In one embodiment, swivel coupling element 16 may be made from carbon steel, but it is to be understood with benefit of this disclosure that it may be made from any other material(s) including, but not limited to, alloy steel, Inconel, high chrome, high nickel, stainless, duplex stainless steels, or any combination thereof.

Figure 6B:
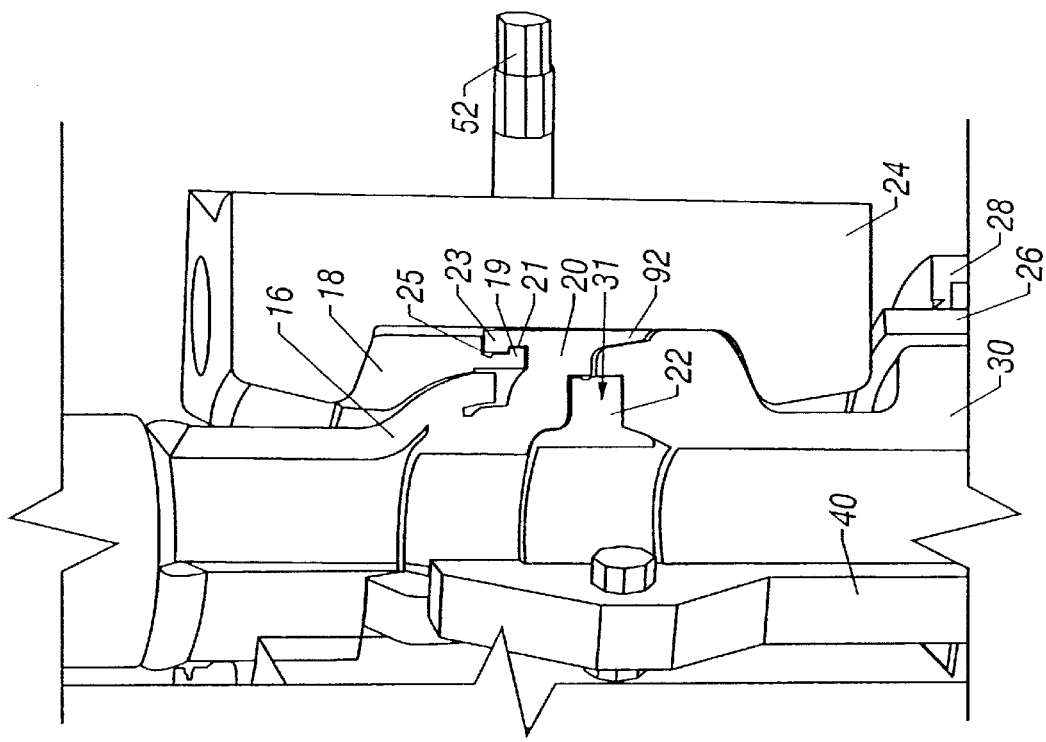
FIG. 6B is a detailed three dimensional view of a connector apparatus having a closed clamp, according to one embodiment of the presently disclosed method and apparatus.
Figure 6A:
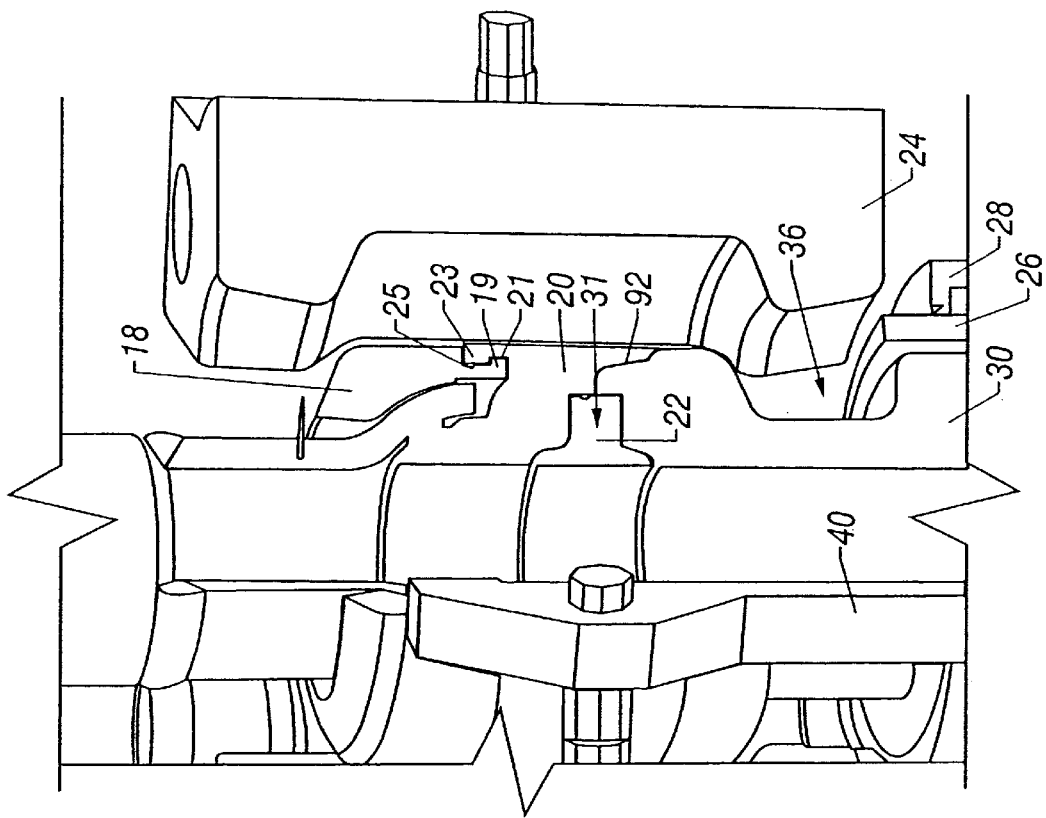
FIG. 6A is a detailed three dimensional view of a connector apparatus having an open clamp, according to one embodiment of the presently disclosed method and apparatus.

As seen clearly in FIG. 6A and FIG. 6B, swivel coupling element 16 may be arranged in a position intermediate grip 18 and ball nose 20. In illustrated embodiments, such an arrangement may allow for rotational and articulating motion. As may better be seen in FIG. 1A and FIG. 10, a convex outer surface of swivel coupling element 16 may engage a concave inner surface of grip 18 at gripping location 90 (see, e.g., FIG. 10). More particularly, and with reference to FIG. 7, it may be seen that gripping location 90 may include gripping portion 90a of grip 18 and gripping portion 90b of swivel coupling element 16. These two portions may engage, generally, at gripping portion 90 of FIG. 10. In one embodiment, the surfaces of grip 18 and/or swivel coupling element 16 may be treated to facilitate or improve gripping characteristics. A concave inner surface of swivel coupling element 16 may engage a convex outer surface of ball nose 20 to form a seal. More particularly, and with reference to FIG. 7, it may be seen that portion 110a of swivel coupling element 16 may sealingly engage with portion 110b of ball nose 20 to form a seal. Such a seal, as is the case for all seals described herein, may be any type of seal including, but not limited to, a metal to metal seal.

The design described above advantageously may allow for 360 degrees or less of rotational motion and, in one embodiment, about twenty degrees or less of articulating motion. Regarding rotational motion, active connector 50 may rotate 360 degrees or less about an axis 13 depicted in FIG. 1A. Again, if so desired rotation may be limited to less than 360° to fit specific requirements.

Figure 9B:
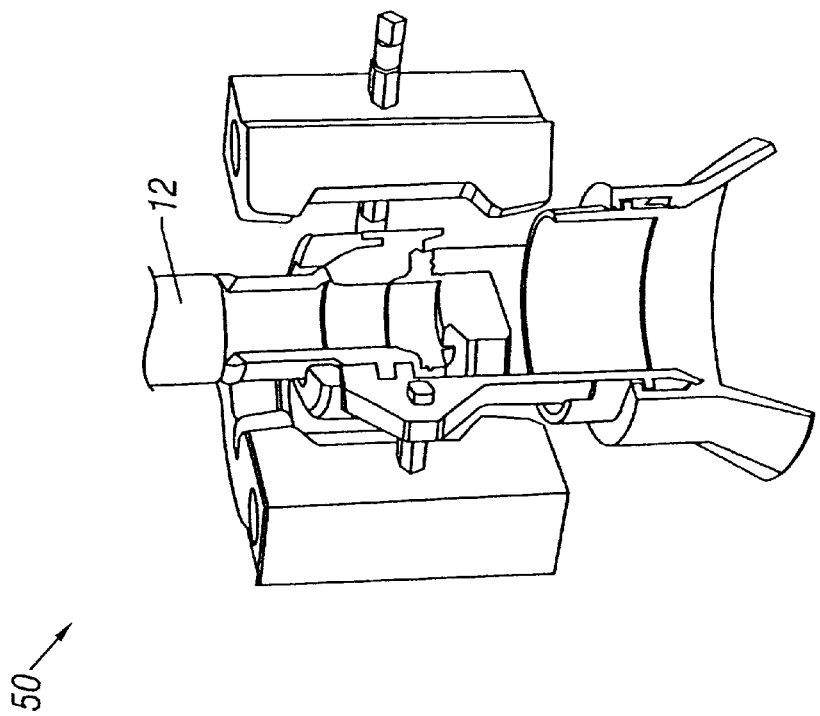
FIG. 9B is a three dimensional view illustrating articulating motion of a connector apparatus according to one embodiment of the presently disclosed method and apparatus.
Figure 9A:
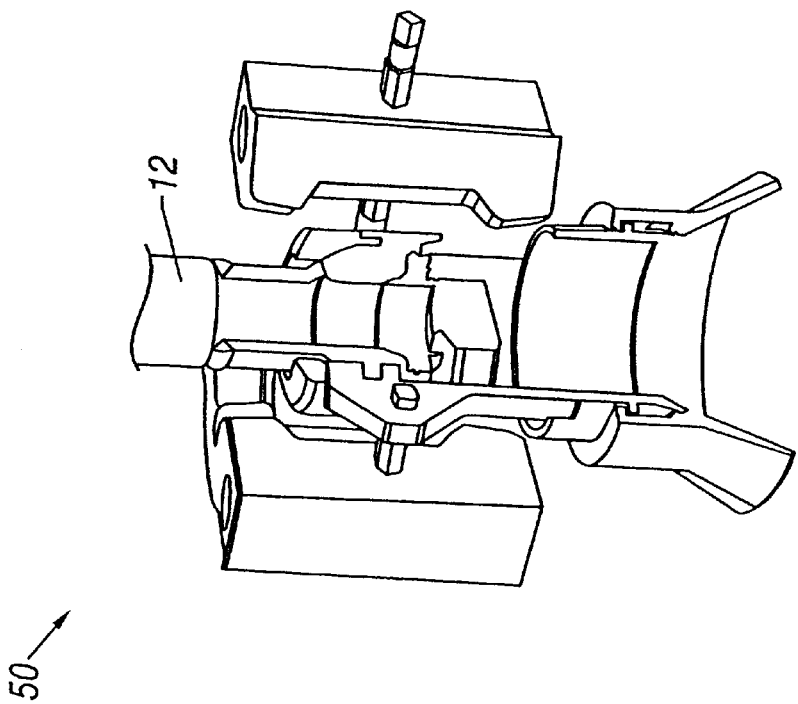
FIG. 9A is a three dimensional view illustrating articulating motion of a connector apparatus according to one embodiment of the presently disclosed method and apparatus.

Reference to FIG. 9A and FIG. 9B better illustrates what is meant by articulating motion. In FIG. 9A and FIG. 9B, it may be seen that swivel coupling element 16, grip 18, and ball nose 20 allow for articulating motion that may also be described as a swiveling motion. Here, that swiveling motion is illustrated as both articulating motion to the rear and left and articulating motion to the front and right. However, it will be understood that swivel coupling element 16 may be configured such that articulating motion may occur toward any direction, or alternatively may be limited to occur in collected directions if so desired. FIGS. 9A and 9B demonstrate that articulation of active connector 50 may occur adjacent a connection site. In particular, according to the present disclosure, active connector 50 may be configured to exhibit articulation at or near the end of first line 12 so that articulation may be provided adjacent the connection locus of lines 12 and 14. As mentioned earlier, providing articulation at or near a connection site advantageously reduces stress at the connection site, increasing the reliability and durability of the seal. Additionally, providing articulation as illustrated herein (adjacent the connection site, rather than, for instance, at a mid-line location), advantageously eliminates the need for any additional restraining support mechanisms. More specifically, mid-line articulation systems may need to be supported or restrained so that their mid-sections do not sag. Embodiments described herein utilizing connection site articulation, however, do not need such additional support or restraint, for the articulation does not contribute to unwanted sagging or other undesirable swiveling.

Figure 17:
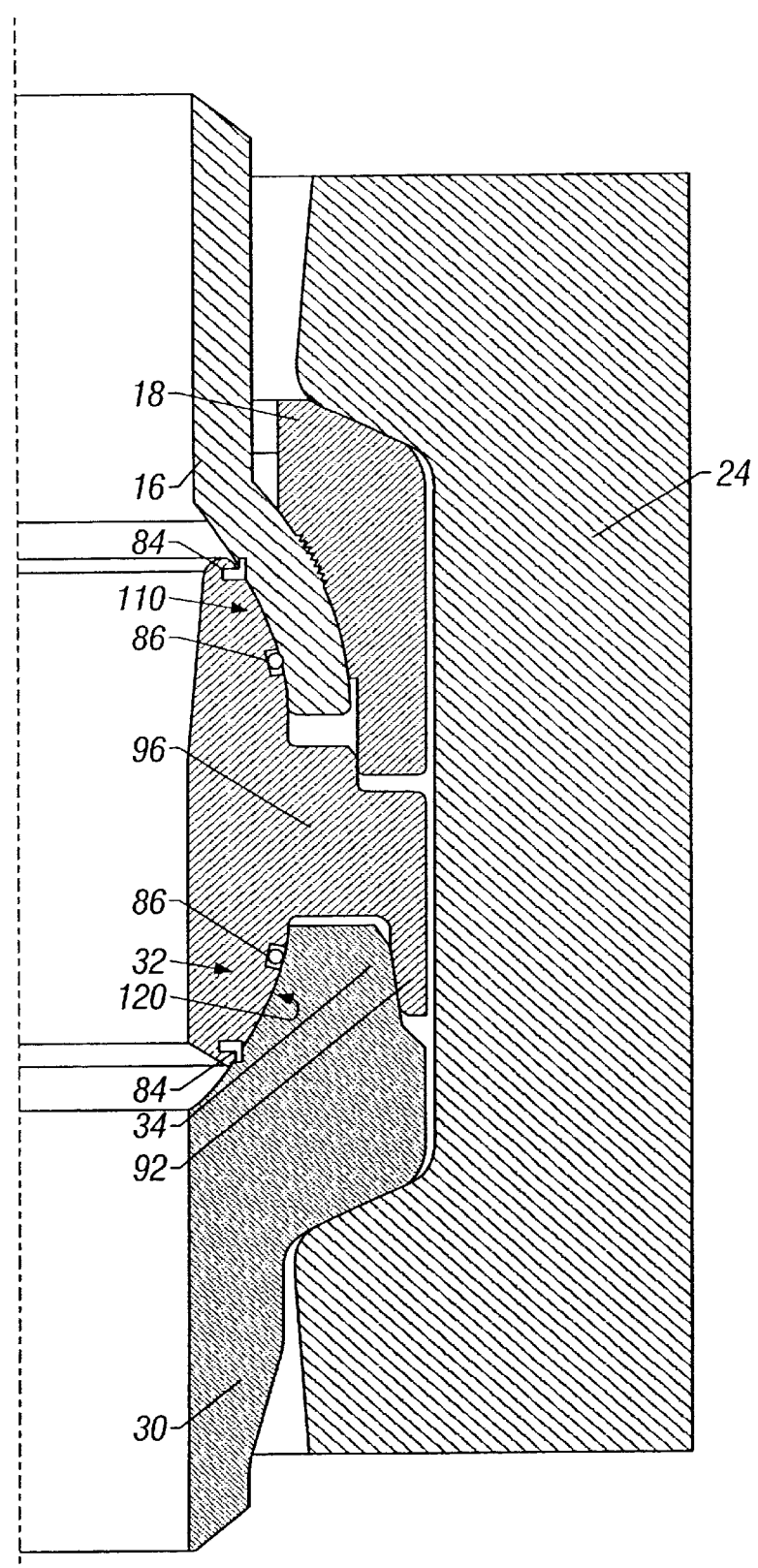
FIG. 17 shows an embodiment utilizing an integral ball nose and seal according to one embodiment of the presently disclosed method and apparatus.
Figure 18:
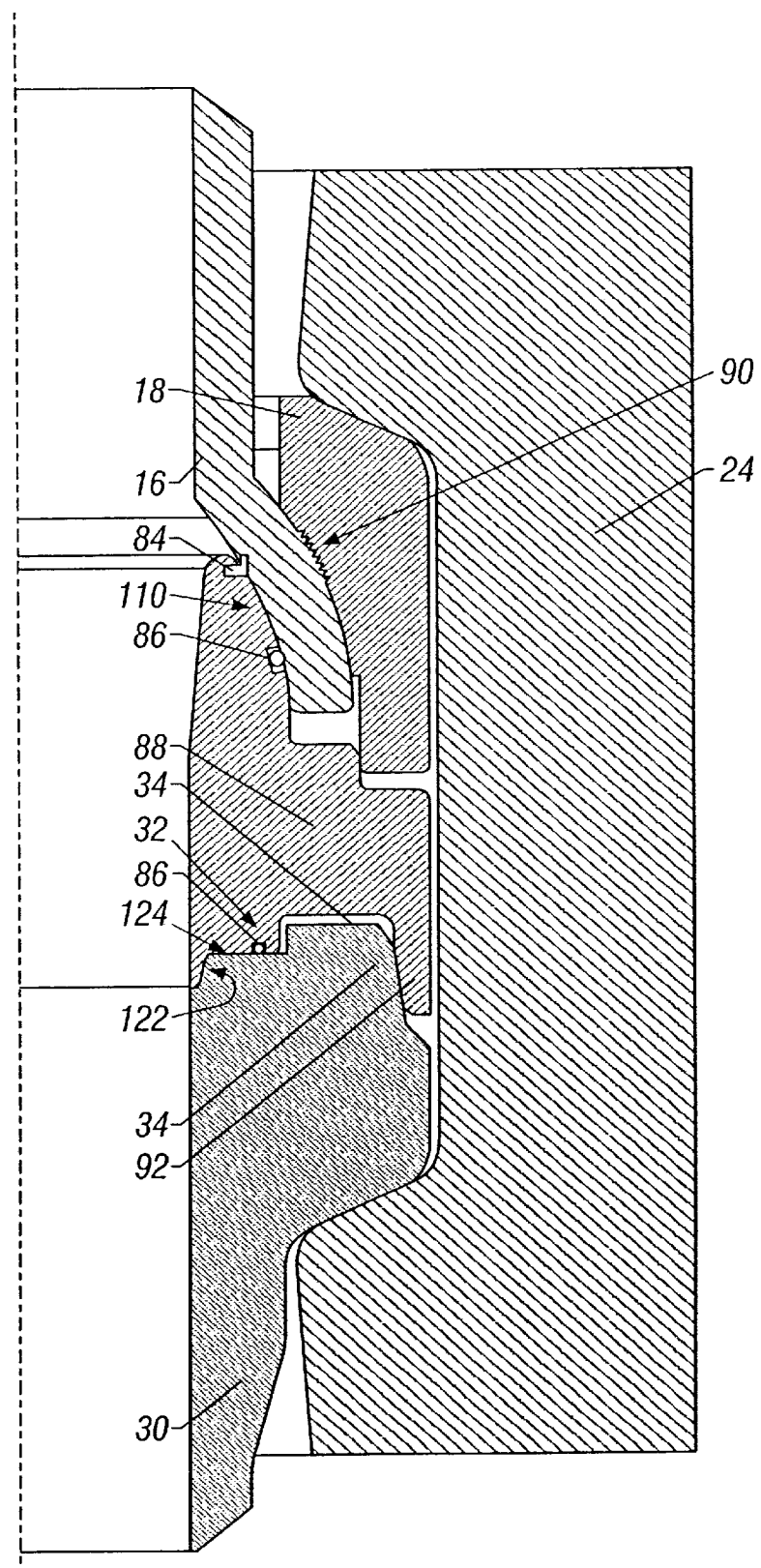
FIG. 18 shows another embodiment utilizing an integral ball nose and seal according to one embodiment of the presently disclosed method and apparatus.

With benefit of this disclosure, those of skill in the art will recognize that the design of the present apparatus may be modified to allow for different degrees and types of articulating motion. In particular, depending upon the design, and more particularly, the curvature and engagement of swivel coupling element 16, grip 18 and ball nose 20, different degrees of articulating motion may be achieved. In one embodiment, articulating motion up to about 20 degrees or less (in any direction) may be achieved. In another embodiment, about 12.5 degrees or less (in any direction) of articulating motion may be achieved. In yet another embodiment, about 5 degrees or less (in any direction) of articulating motion may be achieved. In still another embodiment, about 2 degrees or less (in any direction) of articulating motion may be achieved. In one embodiment, the degree of motion may be greater in one direction than another. In one embodiment, articulation may be in discrete steps instead of the continuous motion articulation here illustrated. For instance, articulation may be ratcheted or otherwise controlled so that motion may be limited to occur in discrete units. In one embodiment, articulation may be distributed between two or more locations. For example articulation may be combined with one or more sealing components. FIG. 17 and FIG. 18 demonstrate an embodiment where articulation of swivel coupling element 16 may be associated with integral seal 96 and 88, of FIG. 17 and FIG. 18, respectively.

Grip 18 may be attached to ball nose 20 as illustrated in FIG. 1A and FIG. 1B, and as clearly illustrated in FIG. 2, FIG. 5, FIG. 6A and FIG. 6B. As illustrated, in one embodiment grip 18 may be attached to ball nose 20 through the use of reciprocal, interlocking tongues and grooves. A projecting tongue portion 19 (see FIG. 6A and FIG. 6B) defined in the lower region of grip 18 may matingly engage a recess 21 (see FIG. 6A and FIG. 6B) defined in upper region of ball nose 20. Likewise, a projecting tongue 23 (see FIG. 6A and FIG. 6B) defined in an upper region of ball nose 20 matingly engages a recess 25 (see FIG. 6A and FIG. 6B) defined in grip 18. This attachment, adjacent a lower portion of swivel coupling element 18, with the curved portion of swivel coupling element 16 intermediate, may be used to provide the motion capabilities of connector 10 mentioned above. Alternatively, the grip 18 and the ball nose 20 may be joined together by threading the area shown as tongue and groove in FIG. 6A and FIG. 6B. In one embodiment, a set of bolts may also be used to join the grip 18 and ball nose 20.

In one embodiment, springs may be included in the assembly of the grip 18 and ball nose 20. The springs may be used to adjust the stiffness or resistance to rotation or articulation. The springs may be used as individual springs surrounding one or more assembly bolts or as a single spring positioned intermediate grip 18 and ball nose 20.

In one embodiment, grip 18 may be constructed from carbon steel, but any other suitable material such as those used in swivel coupling element 16 may be substituted therewith. Likewise, ball nose 20 may be constructed from any suitable material, including the same materials as swivel coupling element 16. The size of both grip 18 and ball nose 20 may vary widely, depending upon the size of swivel coupling element 16, which itself may depend upon, among other things, the size of first line 12 and second line 14.

In one embodiment, a seal 22 may be coupled to ball nose 20. Seal 22 may be connected to ball nose 20 by a detent device-, but those of skill in the art will recognize that several other connection techniques may be utilized including, but not limited to, threads on the external surface of the seal or friction or grub screws. Seal 22 may be a ribbed metal seal, and more particularly, a GRAYLOCK or AX type seal. Other seals and/or combinations of seals may also be used. For instance, ANSI R or RX, or API BX seals may also serve as the connection locus for first line 12 and second line 14.

In one embodiment, seal 22 may be configured to seat in mating engagement with sealing surface 32. In one embodiment, more clearly illustrated in FIG. 4, sealing surface 32 may be defined by hub 30. Sealing surface 32 may be of the same material as hub 30 or may be made up of one or more different materials. In one embodiment, sealing surface 32 may be formed with an overlay. The purpose of such an overlay may be corrosion resistance, hardness, or to modify friction characteristics. In one embodiment, sealing surface 32 may be about the same width as the seal face, but the dimensions may vary widely according to need and according to, for instance, the size of first line 12 and second line 14. In one embodiment, a minimum diameter of sealing surface 32 may be larger than a minimum diameter of the interior of hub 30, so that the inner edge of sealing surface 32 may be defined by an inwardly sloping surface. However, it is contemplated that a minimum diameter of sealing surface 32 may be smaller than a minimum diameter of the interior of hub 30, so that the inner edge of sealing surface 32 may be defined by an outwardly sloping surface. The degree of slope may vary widely, but in one embodiment, it may be about 20 degrees. The sealing slope may be at a single angle or at multiple angles. Multiple angles may accommodate improved sealing, or may allow sealing at multiple locations.

The embodiment of FIG. 17 illustrates that ball nose 20 may be combined with seal 22 to form an integral ball nose 96. In this embodiment, it may be seen that integral ball nose 96 may form seals at locations 110 (see also, FIG. 7) and 120. Such seals may be metal to metal seals or any other suitable seal. The embodiment of FIG. 18 demonstrates another embodiment in which a ball nose may be combined with a seal. In this embodiment, an integral ball nose 88 is utilized. Integral ball nose 88 may form seals at locations 110 (see also FIG. 7), 124, and 122. In these embodiments, and in the other embodiments described herein, annulus seals 86 and debris wipers 84 may be utilized as illustrated.

However, with benefit of this disclosure, it will be understood that seals may be formed in embodiments that do not utilize annulus seals 86 and/or debris wipers 84.

Figure 7:
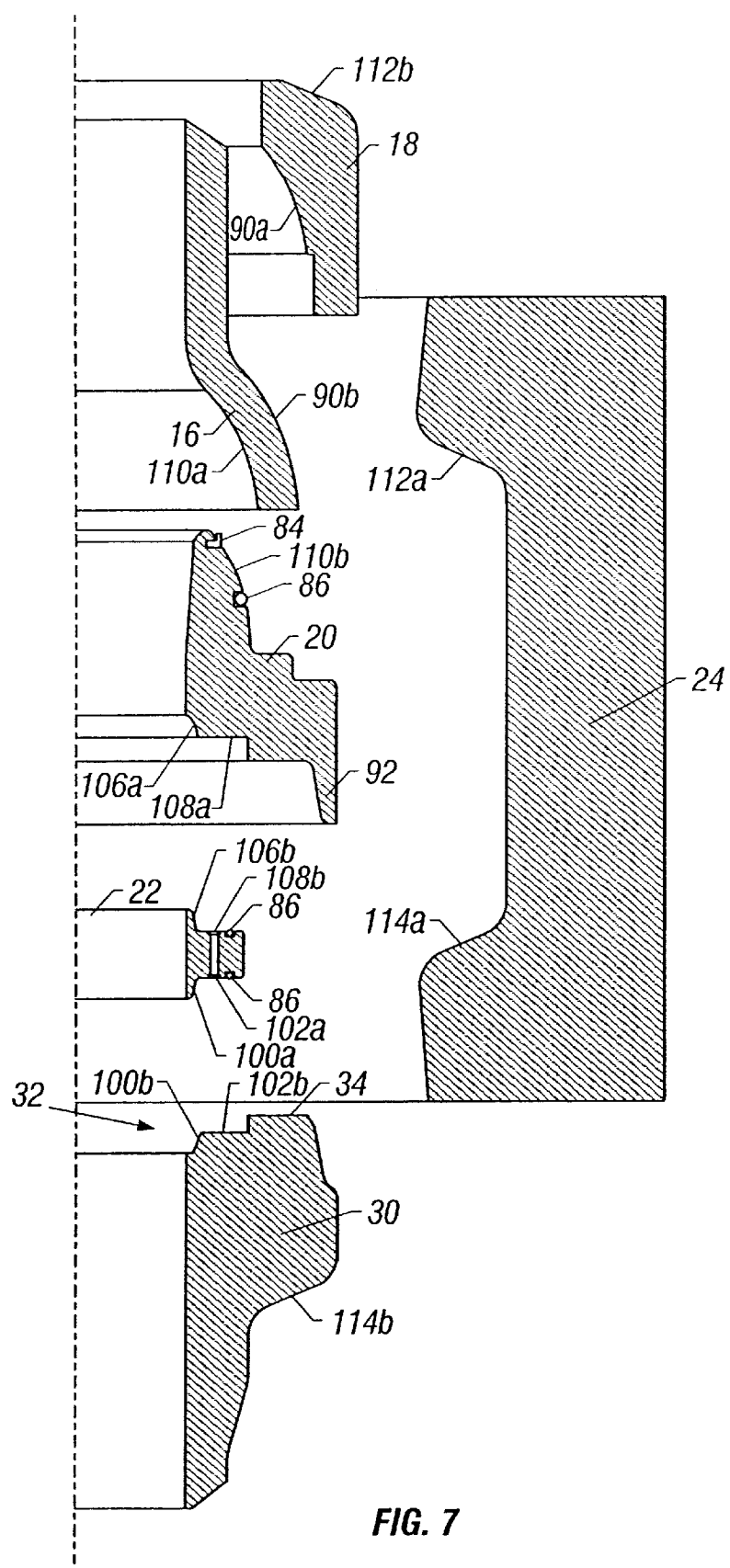
FIG. 7 illustrates sealing of a connector apparatus according to one embodiment of the presently disclosed method and apparatus.

With reference to FIG. 7, it may be seen how sealing may be achieved according to one embodiment of the presently disclosed apparatus. There, gripping portion 90*a* of grip 18 may be configured to engage gripping portion 90*b* of swivel coupling element 16. Portion 112*b* of grip 18 may be configured to engage portion 112*a* of clamp 24. Portion 110*a* of swivel coupling element 16 may form a seal with portion 110*b* of ball nose 20. More particularly, a seal may be formed between swivel coupling elements 16 and ball nose 20 adjacent debris wiper 84 and annulus seal 86 of portion 110*b*. Portion 106*a* of ball nose 20 may form a seal with portion 106*b* of seal 22. Portion 108*a* of ball nose 20 may form a seal with portion 108*b* of seal 22. In one embodiment, the seal may be adjacent portion 106*b* and annulus seal 86. Portion 100*a* of seal 22 may form a seal with portion 100*b* of hub 30, and more particularly, with portion 100*b* of sealing surface 32. Portion 102*a* of seal 22 may form a seal with portion 102*b* of hub 30, and more particularly, with portion 102*b* of sealing surface 32. In one embodiment, the seal may be adjacent portion 100*a* and annulus seal 86. Portion 114*b* of hub 30 may be configured to engage portion 114*a* of clamp 24. Portion 92 of ball nose 20 may advantageously engage alignment lip 34, as discussed previously, to allow for guidance of seal 22 into position without using the seal for alignment. Again, in the description above, seals may be of any type including metal to metal seals. Seals may be formed without debris wiper(s) 84 and/or annulus seals 86.

Figure 8:
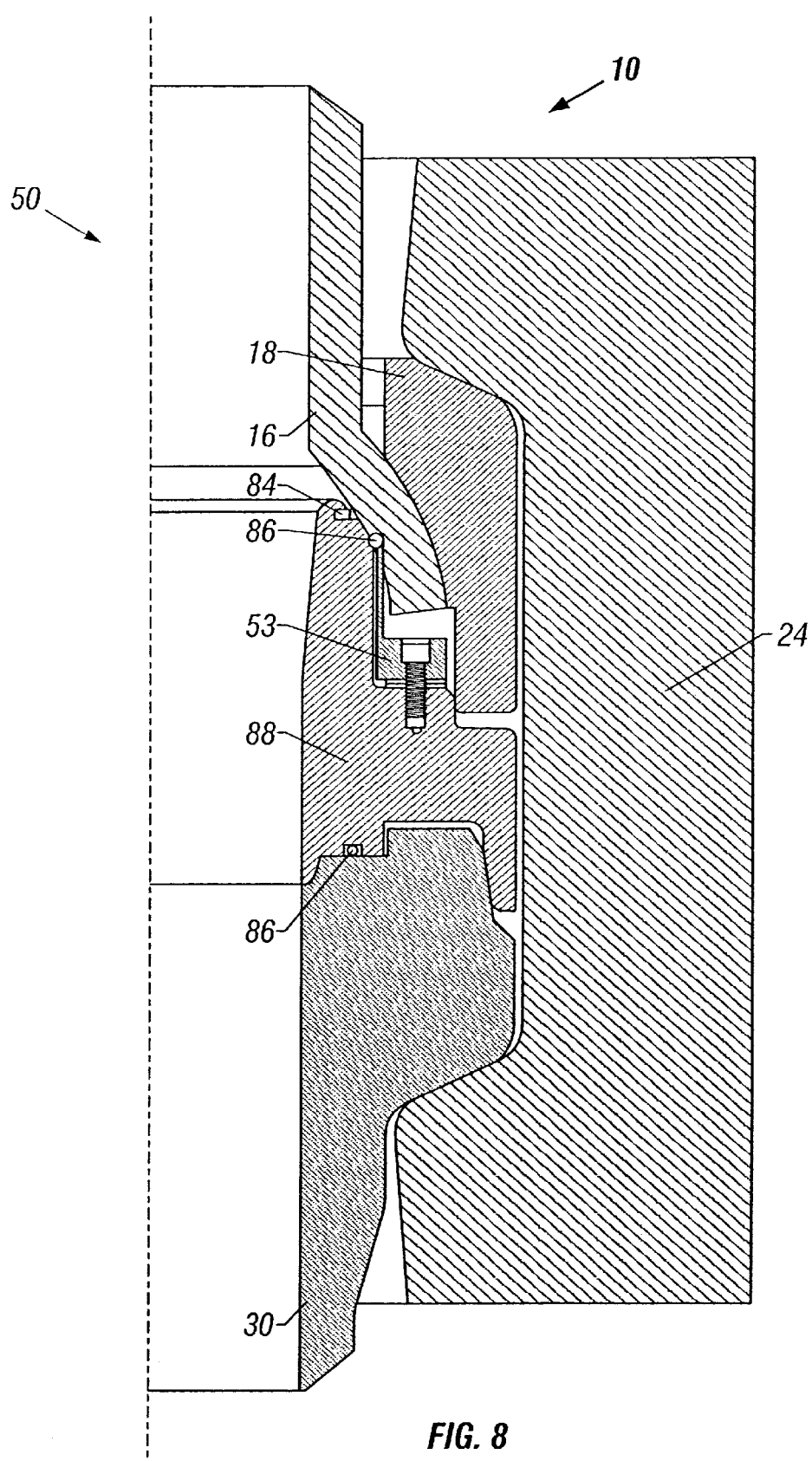
FIG. 8 is a cross sectional view of a connector apparatus having a replaceable seal according to one embodiment of the presently disclosed method and apparatus.

With the benefit of the present disclosure, those having skill in the art will understand that other sealing arrangements may be utilized other than that of the embodiment of FIG. 7. For instance, with reference to FIG. 17, it may be seen that integral ball nose 96 may form a seal with swivel coupling element 16 at location 110, and may form a seal with hub 30, and more particularly, sealing surface 32 at location 120. These locations may be, in one embodiment, adjacent annulus seals 86 and/or debris wipers 84. In the embodiment of FIG. 18, it may be seen that integral ball nose 88 may form a seal with swivel coupling element 16 at location 110 and with hub 30, and more particularly sealing surface 32 at locations 122 and 124. As with the embodiment of FIG. 17, the sealing locations may be adjacent locations of annulus seals 86. With the benefit of this disclosure, annulus seals 86 and debris wiper 84 may be standard annulus seals and debris wipers as are known in the art. For instance, annulus seals 86 may be O-rings or any suitable device and may be constructed from, for example, viton, PTFE, urethane, or any other suitable material. Debris wiper 84 may be constructed from, in one embodiment, polymers or urethane, or any other suitable material FIG. 8 illustrates that integral ball nose 88 may act as a replaceable sealing unit. In the embodiment of FIG. 8, connector apparatus 10 may include a securing member 53. In one embodiment, securing member 53 may be coupled to an upper portion of integral ball nose 88, adjacent annulus seal 86, and may be configured to secure integral ball nose 88 to ensure that integral ball nose 88 may be removed as a single unit. More specifically, in this embodiment, and in other illustrated embodiments, it is contemplated that active connector 50 may be separated from hub 30 so that a replaceable sealing unit, such as integral ball nose 88 in FIG. 8 (or, in other embodiments, the ball nose 20/seal 22 combination in, e.g., FIG. 10) may be removed and replaced with another sealing unit. In such an embodiment, connector apparatus 10 advantageously provides for the ability to easily replace sealing elements, as a manageable unit, subsea. In illustrated embodiments, it is contemplated that securing member 53, or a like structure, may be utilized to secure sealing elements together to form a sealing unit that may be replaced. With the benefit of the present disclosure, those having skill in the art will recognize that other structures different in design from securing member 53 may be used. Also, it will be understood that a sealing unit need not necessarily consist of a single unit. Rather, more than one element may be configured to be removed from active connector 50 so that replacement element(s) may be inserted.

In illustrated embodiments, and easily seen with reference to FIG. 4, FIG. 7, FIG. 17, and FIG. 18, an alignment lip 34 may be defined by hub 30. Along with sealing surface 32, alignment lip 34 may be configured to protect, to receive, and to seat seal 22 (or any of the combination ball noses described above) into sealing association to join first line 12 to second line 14. More specifically, a ribbed portion 31 (see FIG. 6A and FIG. 6B) of seal 22 may be configured to sit in recess 33 (see FIG. 4) defined by sealing surface 32 and alignment lip 34 as may be clearly seen with reference to FIG. 4, FIG. 5, FIG. 6A, and FIG. 6B. Alignment surface 34 may be configured to protect and guide seal 22 toward sealing surface 32 without damaging, bumping, or scratching any seal. It will be understood that seal 22 eventually must make contact and may, in fact, encounter a degree of bumping with another surface, such as sealing surface 32 during, for instance, seating and while being drawn into sealing contact. However, it is to be stressed that during alignment, seal 22 may nonetheless avoid damage because, in illustrated embodiments, it need not perform alignment functions. With reference to FIG. 5, FIG. 6A, FIG. 6B, FIG. 7, FIG. 17, and FIG. 18, it may be more clearly seen that alignment lip 34 may mate with portion 92 of ball nose 20. In particular, a surface of portion 92 of ball nose 20 may be configured to matingly engage an outer surface of alignment lip 34. When so configured, the guiding of seal 22 may be facilitated without using any seal for alignment. More particularly, portion 92 and alignment lip 34 may cooperatively direct and locate seal 22 (or any combination ball nose such as combination ball noses 96 and 88 illustrated in FIG. 17 and FIG. 18) into seating alignment. Again, sealing surface 32 advantageously need not perform alignment functions that may scratch or otherwise harm the sealing surface and lead to, for instance, failure to achieve a seal, or a short product lifetime.

Alignment lip 34 may be constructed from the same material as hub 30 or may be made up of one or more different materials. In one embodiment, sealing surface 32 may be made from a hardenable steel and attached to the hub 30, but any other suitable material may be substituted therewith. In one embodiment, the height of alignment lip 34 may be about equal in height to the engagement length of the seal. However, it is contemplated that its dimensions may vary widely.

Clamp 24 may be arranged in operative relation to seal 22 so that it may close about swivel coupling element 16 to seal lines 12 and 14. Clamp 24 may be made of any suitable material including, but not limited to, ASI 4130, 4140, or 8630. In illustrated embodiments, clamp 24 includes segments arranged in opposing relation, but it is contemplated that segments need not be used, or that more or fewer segments may be used. For instance, with the benefit of the present disclosure, those of skill in the art will recognize that several different types of clamps known in the art may be substituted for the clamp illustrated herein. For instance, one may use a clamp such as the original GRAYLOC clamp, the Cameron MCPAC clamp, or the Vetco GSR clamp.

FIG. 2, FIG. 5, FIG. 6A, FIG. 6B, FIG. 9A, and FIG. 9B illustrate that clamp 24 may include a manual or remotely operable clamp actuator such as bolt 52. Bolt 52 may be configured to advance opposing sides of clamp 24 toward swivel coupling element 16. Specifically, bolt 52 may be configured to fit within a remotely operable device such as torque make-up tool 70 of FIG. 16. In one embodiment, bolt 52 may be constructed from ASTM A193 Grade B7 stud material and may be about equal or slightly larger than an ANSI stud designated for that class of fitting. The number of threads per inch may be as large as reasonably possible, and in one embodiment, may be an 8-pitch thread form. The greater number of threads may decrease the thread ramp angle and thus reduce the tendency to reverse motion under load. Bolt 52 may be made from high alloy steels in one embodiment. The thread form may be a standard V-thread or one of the ACME thread forms.

It will be understood that other types of clamp actuators may be employed including, but not limited to, hydraulic devices, pneumatic devices, and electromechanical devices. These may be either an integral part of the deployed connection system or be a part of a removable installation tool. Clamp 24 may be supported about swivel coupling element 16 by support structure 40 as may be seen clearly in FIG. 2, FIG. 5, FIG. 9A, and FIG. 9B. As illustrated, support structure 40 may be configured to receive bolt 52, via an appropriately sized opening or by other means suitable for securely holding the bolt. In illustrated embodiments, a proximate end 37 (see FIG. 1A and FIG. 1B) of support structure 40 may be coupled to seal 22 via connection with grip 18, which may be seen clearly with reference to FIG. 1A. In illustrated embodiments, a distal end 39 (see FIG. 1A) of support structure 40 may be connected to soft landing body 26, which will be discussed below.

Figure 4:
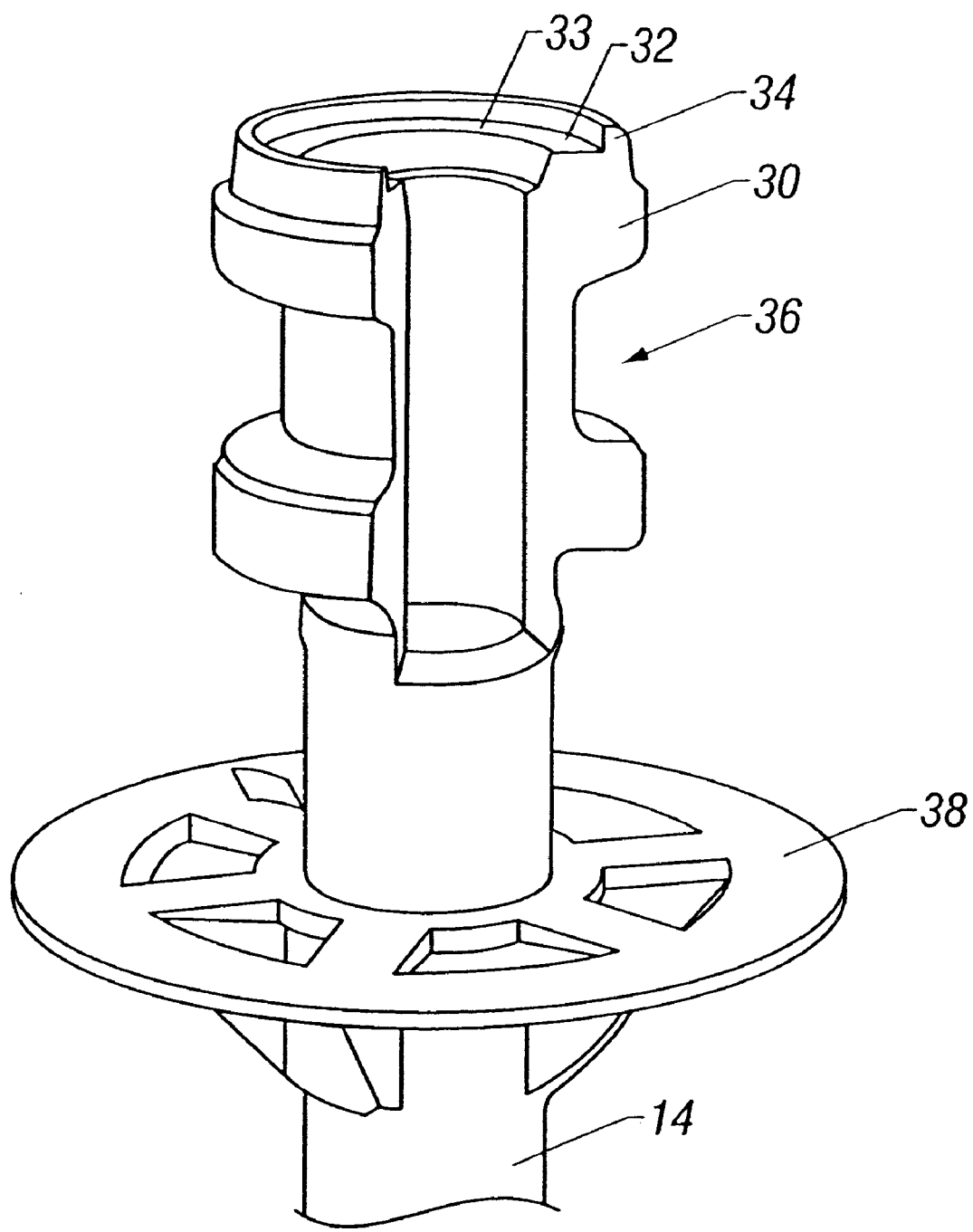
FIG. 4 is a three dimensional view of a hub assembly according to one embodiment of the presently disclosed method and apparatus.

In one embodiment, a lower portion 41 (see FIG. 1A and FIG. 1B) of clamp 24 may be configured to mate with clamping recess 36 (see, e.g., FIG. 1A). As illustrated in FIG. 4, clamping recess 36 may be defined by hub 30. More specifically, hub 30 may include a recess designed to mate with projecting portions of clamp 24. The mating engagement of clamp 24 with clamping recess 36 may be seen clearly with reference to FIG. 1B, FIG. 5, and FIG. 6B, all of which show clamp 24 matingly engaging clamping recess 36, the clamp being in a closed position about swivel coupling element 16. With reference to FIG. 7, it may be seen that, in one embodiment, portion 114a of clamp 24 may engage portion 114b of hub 30 during the sealing process. Although in illustrated embodiments clamping recess 36 is depicted as having a generally rectangular shape, those of skill in the art will recognize that clamp 24 and clamping recess 36 may take the form of any number of matching shapes suitable to allow for mating engagement. Although clamping recess 36 may be constructed from the same material(s) as hub 30, it is contemplated that different materials may be used. Additionally, one or more surfaces of clamping recess 36 may be treated with one or more materials as is known in the art. Such materials may, for instance, resist corrosion or facilitate mating engagement. Likewise, projecting portions of clamp 24 may be constructed from one or more different materials from the rest of clamp body 24. Additionally, projecting portions of clamp 24 may be treated as described above to increase durability or enhance mating engagement parameters.

An upper portion 43 (see FIG. 1A and FIG. 1B) of clamp 24 may be configured to mate with grip 18. More specifically, grip 18 may include an appropriately shaped outer surface adapted to matingly engage an inner surface clamp 24. With reference to FIG. 7, it may be seen that, in one embodiment, portion 112a of claim 24 may engage portion 112b of grip 18. Although in illustrated embodiments, clamp 24 defines an inner surface having a shape that is generally rectangular, those of skill in the art will recognize that clamp 24 and grip 18 may take the form of any number of matching shapes that allow for mating engagement.

The illustrated embodiment of FIG. 4, showing hub assembly 54, demonstrates that hub 30 may be coupled to second line 14. Hub 30 may be coupled to second line 14 by any means suitable, including butt welding. Although its diameter may vary widely according to, for instance, the size of second line 14, in one embodiment hub 30 may range from about 2 inches to about 30 inches, and more particularly, from about 4 $\frac{1}{16}$ inches to about 16 inches.

Shown in FIG. 1A, FIG. 1B, FIG. 4, and FIG. 5 is landing base 38. Landing base 38 may be arranged in operative relation to hub 30, and more particularly, may be connected to second line 14 adjacent hub 30 by any suitable means. In one embodiment, landing base 38 may be constructed from any structural grade materials, but those of skill in the art will recognize that other materials suitable for supporting a load may be used. In one embodiment, landing base 38 may be generally circular, but any other shape suitable to receive and support alignment cone 28 may be used. For instance, other embodiments may utilize other shapes such as rectangles, ellipses, diamonds, or polygons. In illustrated embodiments, landing base 38 may be configured to act in conjunction with alignment cone 28 to land active connector 50 (see FIG. 2) of remote articulated connector 10, with hub assembly 54 of remote articulated connector 10 (see FIG. 4). More particularly, landing base 38 may be configured to receive alignment cone 28 so that active connector 50 may be placed in proper position throughout the connection process, as will be described in more detail below.

Figure 3:
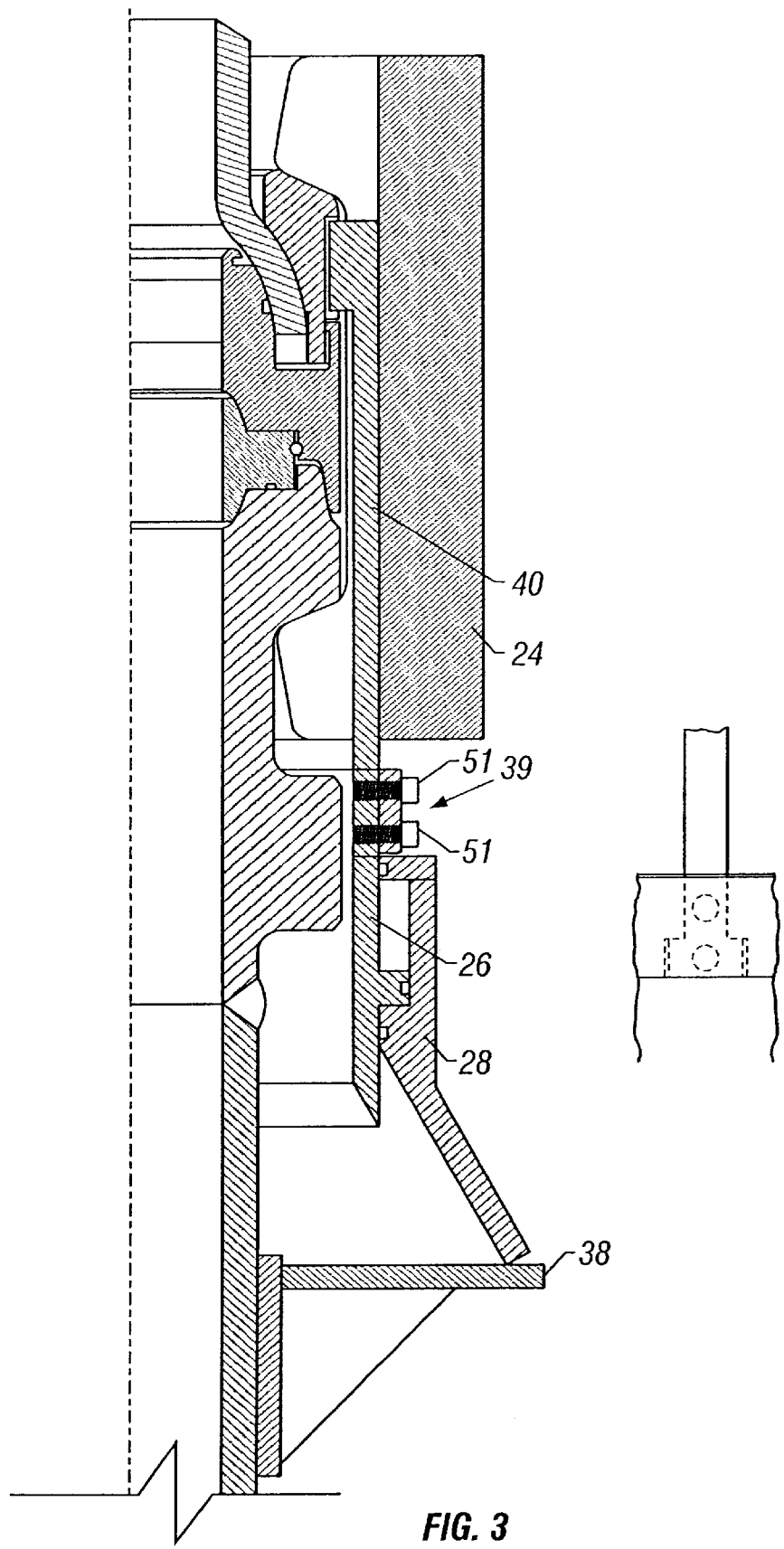
FIG. 3 is a detailed view showing a connection between a support structure and a soft landing body according to one embodiment of the presently disclosed method and apparatus.

Turning to FIG. 1A, FIG. 1B, FIG. 2, and FIG. 5, there is shown soft landing body 26 and an alignment cone 28. Soft landing body 26 may be arranged in operative relation to seal 22, and more particularly, it may be coupled to distal end 39 (see FIG. 1A) of support structure 40. Attachment means for connecting to support structure 40 may be by any suitable means. The embodiment of FIG. 3 illustrates one way in which soft landing body 26 may be coupled to support structure 40. There, it may be seen that distal end 39 of support structure 40 may be bolted to soft landing body 26 via bolts 51. In illustrated embodiments, soft landing body 26 may be equipped with one or more tabs or rings 27. Soft landing body 26 may be coupled to alignment cone by any suitable means, but in the illustrated embodiments, it may be connected via two interlocking tongue and grooves—as indicated in FIG. 1A, FIG. 1B, FIG. 2, and FIG. 5. As illustrated, such tongue and grooves may be positioned near the middle and bottom portion of soft landing body 26. However, with the benefit of the present disclosure, those of skill in the art will understand that other connection techniques may be substituted for the illustrated tongues and grooves, and different connection locations may be utilized.

Figure 5:
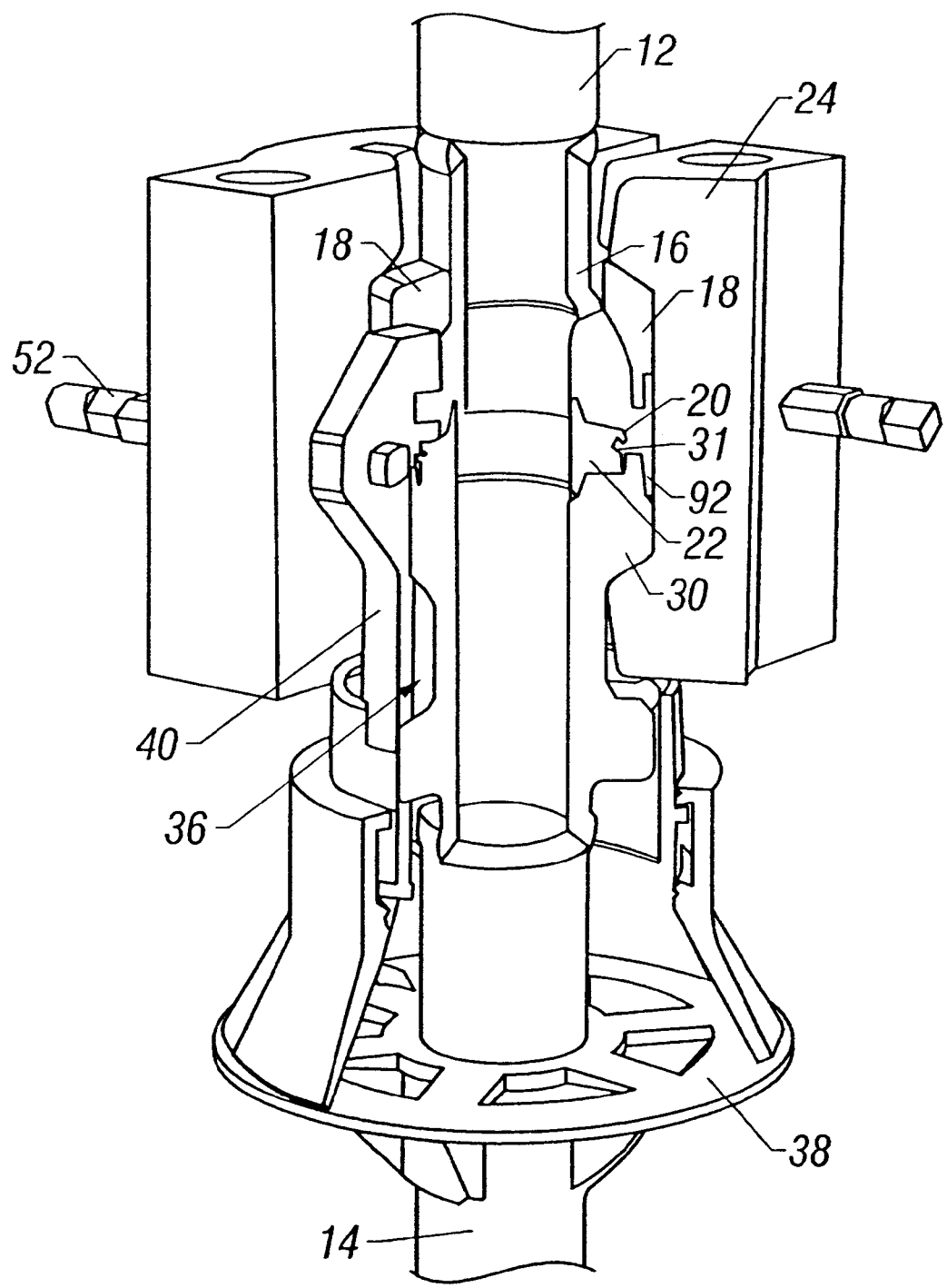
FIG. 5 is a three dimensional view of a connector apparatus according to one embodiment of the presently disclosed method and apparatus.

In one embodiment, soft landing body 26 slidably engages alignment cone 28. In one embodiment, sliding may be hydraulic. In other words, soft landing body 26 may be coupled to a hydraulic device that controls the relative motion of soft landing body 26 and alignment cone 28. In one embodiment, the hydraulic device may be a piston, but any other device suitable for controlling relative movement may be substituted therewith. In one embodiment, soft landing body may slide relative to alignment cone 28 in between the tongue and groove connection points. With reference to FIG. 1A, it may be seen that tabs 27 may be in an upper position relative to alignment cone 28, while in FIG. 1B, soft landing body 26 has slid downward relative to alignment cone 28 until tabs 27 engage a lip 29 defined by alignment cone 28. In sliding down relative to alignment cone 28, it is to be noted that active connector 50 also slides downward, resulting in seating engagement of seal 22 along sealing surface 32, as illustrated in FIG. 1B and FIG. 5. Although the above paragraph references the motion as being downward motion, it will be understood that the above description applies equally well to motion that is not vertical. In particular, all illustrated embodiments may be adapted to operate with lines facing horizontally, or at any angle, and the descriptions are thus not to limited to vertical arrangements.

Figure 10:
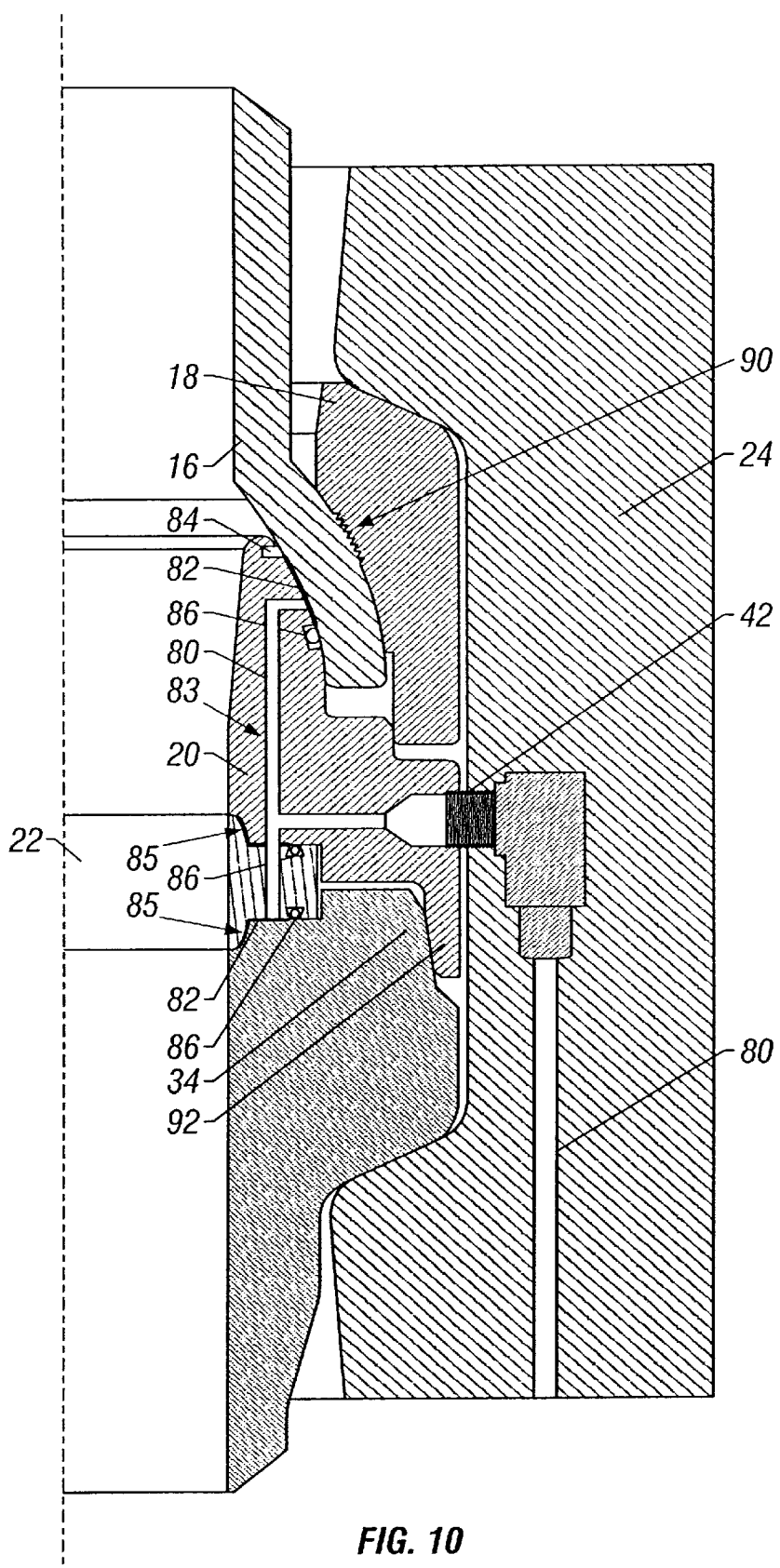
FIG. 10 is a detailed view of a connector apparatus including an annulus testing port according to one embodiment of the presently disclosed method and apparatus.

FIG. 1A and FIG. 1B, and more particularly, FIG. 10 show optional annulus testing port 42. In the illustrated embodiments, annulus testing port 42 may be configured to extend through ball nose 20 so as to be suitable for injection of testing fluid 80 into one or more channels defined adjacent elements in operative relation with seal 22 so that a seal integrity may be evaluated. Annulus testing advantageously quickly ensures that a connection is safe to operate prior to introducing produced fluid into, for example, a pipeline. The ability to quickly test a connection advantageously provides for cost savings during installation and connection of lines. With the benefit of the present disclosure, those of skill in the will understand that different independent ports may be substituted with port 42 and that different areas may of ball nose 20 and/or other elements may be used to accommodate annulus testing.

Turning to FIG. 10, it may be seen that testing fluid 80 may be transported through annulus testing port 42 to test the seals of swivel coupling element 16 and seal 22. More particularly, fluid 80, which may be any fluid suitable or known in the art for annulus testing, may be directed through one or more channels 83 leading toward one or more seals, such as the seals associated with swivel coupling element 16 and seal 22. In illustrated embodiments, fluid 80 may be confined at locations 82 adjacent sealing locations so that the seal may be tested as is known in the art. More specifically, for the swivel coupling element seal in the illustrated embodiment, fluid 80 may be confined between annulus seal 82 and debris wiper 84 at location 82. With reference to FIG. 7, this area may be associated with portions 110a of swivel coupling element 16 and portion 110b of ball nose 20. Likewise, for the seal of seal 22, fluid 80 may be confined between annulus seal 86 and a shoulder 85 of seal 22. With reference to FIG. 7, this area may be associated with portions 100a and 102a of seal 22 and 100b and 102b of hub 30, and portions 106b and 108b of seal 22 and 106a and 108a of ball nose 20.

To sealingly join first line 12 to second line 14, active connector 50 (see FIG. 2) may be coupled to first line 12 as described herein. Hub assembly 54 (see FIG. 4) may be coupled to second line 14 as described herein. In one embodiment, second line 14 may be fixed and coupled to, for instance, a subsea tree or a pipeline end manifold (PLEM), while active connector 50 may be free to move and may be coupled to, for instance, a remotely operated vehicle. In another embodiment, the reverse may be true—active connector 50 may be fixed in place while hub assembly 54 may be free to move. In other embodiments, both active connector 50 and hub assembly 54 may be able to move freely. The remaining description will, for convenience only, assume that second line 14 and hub assembly 54 are fixed and are positioned below (vertically) first line 12 and active connector 50. However, with benefit of this disclosure, those having skill in the art will recognize that other initial configuration may be utilized. For instance, one or both lines may be horizontal or at any angle relative to one another.

Figure 11:
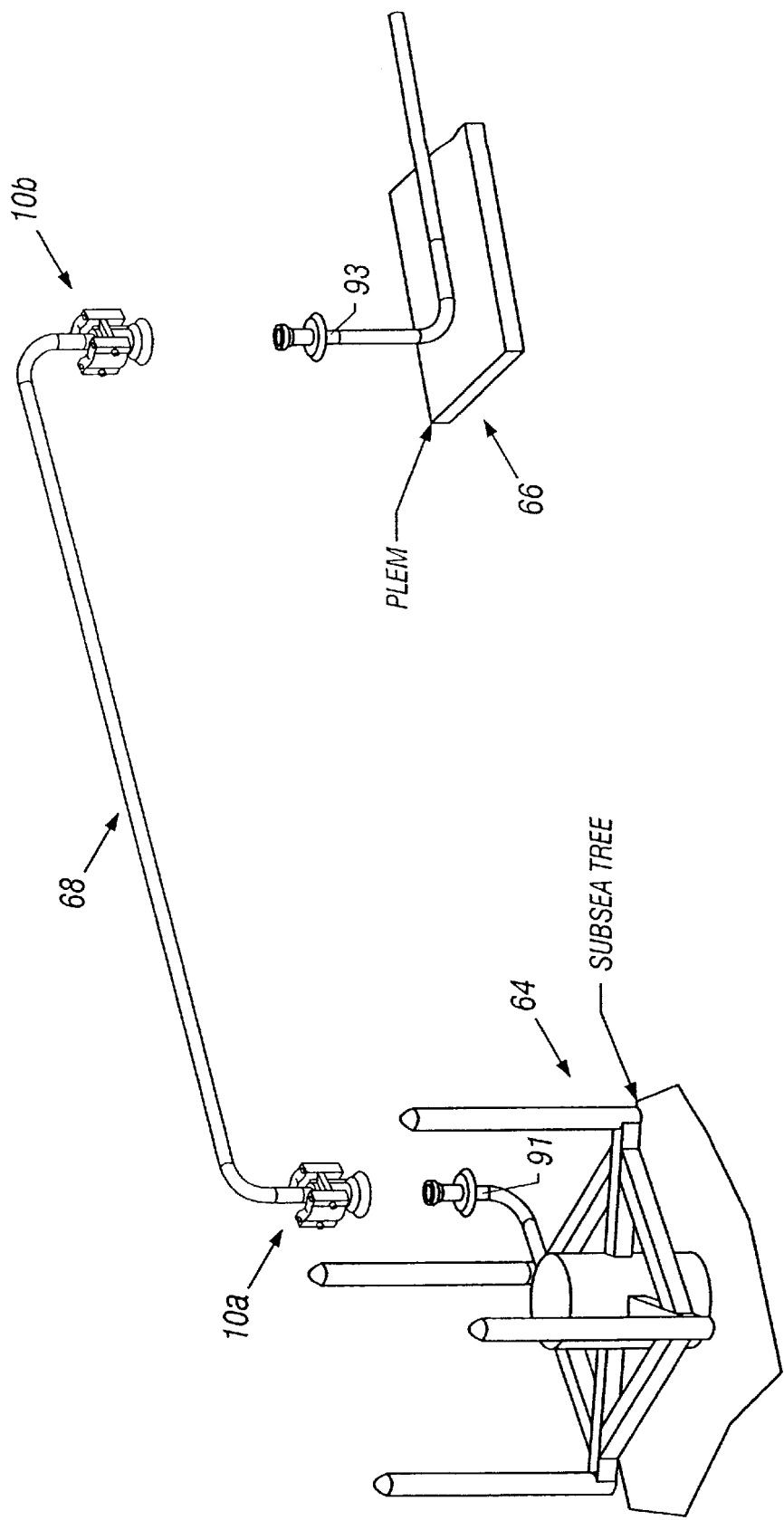
FIG. 11 is a schematic illustration of an installation sequence according to one embodiment of the presently disclosed method and apparatus.

Assuming second line 14 is subsea, a first step in a connection procedure may be to lower active connector 50 toward hub assembly 54 as shown generally in FIG. 11. Lowering may be accomplished in a number of different ways well known in the art. In one embodiment, one or more cables may be attached to first line 12, and active connector 50 may be lowered with the one or more cables from a vessel above second line 14. With active connector 50 positioned generally above hub assembly 54, active connector 50 may be further lowered so that alignment cone 28 passes over an outer surface of hub 30, and more particularly, over an outer surface of alignment lip 34. Again, this embodiment of the disclosed apparatus provides a guiding surface in the form of alignment lip 34 that is distinct from sealing surface 32, and advantageously allows for protection and alignment of the connector without damaging sealing surface 32. More specifically, alignment cone 28 may bump, scratch, rub against, or otherwise engage alignment lip 34 during its journey toward landing base 38 without contacting, scratching, or otherwise degrading the integrity of sealing surface 32.

An inner surface of alignment cone 28 may pass over an outer surface of hub 30 and may continue to be lowered toward landing base 38. As may be noted from FIG. 1A, FIG. 1B, FIG. 2, FIG. 5, FIG. 9A and FIG. 9B, the shape of alignment cone 28 may aid in rough alignment of seal 22 with sealing surface 32. In particular, a decreasing interior diameter of alignment cone 28 may steadily guide active connector 50 to a position directly above hub assembly 54, and more particularly, into a position in which seal 22 is aligned with sealing surface 32. Again, throughout this guiding process, it is to be noted that sealing surface 32 may remain protected from potentially harmful contact because alignment lip 34 (and not sealing surface 32) contacts alignment cone 28. In other words, this embodiment of the disclosed method and apparatus does not require the seal or the sealing surface to perform alignment functions.

When alignment cone 28 engages landing base 38, the active connector may be said to have "hard landed". Thus, as used herein, "hard landing" may refer to the steps leading up to and including engagement of alignment cone 28 with landing base 38. FIG. 1A more clearly illustrates an active connector 50 in a hard-landed state. As may be seen, alignment cone 28 has landed on landing base 38. In this position, active connector 50 is aligned above hub assembly 54 and seal 22 is aligned with sealing surface 32. In this position, clamp 24 is shown as being fully open. Following hard landing, active connector 50 may be further lowered so that a seal may be formed.

Procedures following hard landing may be referred to as "soft landing". In illustrated embodiments, a final lowering step, a "soft landing", may be accomplished by further lowering active connector 50, now aligned over hub assembly 54. The soft landing may occur in an aligned manner at least in part because of the interaction of soft landing body 26 and alignment cone 28. As active connector 50 is lowered further following hard landing, soft landing body 26 may slide relative to alignment cone 28. In one embodiment, sliding may be aided hydraulically. The rate of descent of active connector 50 may be controlled, if so desired as is known in the art. In one embodiment, the materials making up tabs 27 and/or alignment cone 28 may be varied so as to achieve a desirable friction coefficient that may lead to further control of the rate of descent. Further, one may equip soft landing body 26 or alignment cone 28 with a suitable ratchet type mechanism so that the soft landing of active connector 50 may be further controlled. In this case-, the lowering process may be monitored ratchet step by ratchet step.

The sliding of soft landing body 26 relative to alignment cone 28 may serve to ensure that seal 22 remains aligned with sealing surface 32 throughout the soft landing process. Specifically, the rigid, straight profile of soft landing body 26 (seen most clearly in FIG. 1) may keep active connector in-line throughout the soft landing process. Additionally, and with reference to FIG. 7, it may be seen that portion 92 of ball nose 20 may further aid in protection and alignment, avoiding damage to seal 22. In particular, portion 92 may bump or otherwise contact hub 30, and more particularly, alignment lip 34, during descent so that alignment may be achieved. However, it is to be noted that such contact with alignment lip 34 does not adversely affect seal 22, for seal 22 does not align the active connector 50. Reference to soft landing body 26 in FIG. 1B and FIG. 5 illustrate a final position following soft landing. As may be seen, tabs 27 have slid to their lowest extent relative to alignment cone 28. More specifically, tabs 27 have engaged a lower stop 29 of alignment cone 28. FIG. 6A shows that, after soft landing, seal 22 may be in mating engagement with sealing surface 32. In this position, clamp 24 may be activated to close about swivel coupling element 16 so as to draw together seal 22 and sealing surface 32 into a sealing association to connect first line 12 to second line 14.

In illustrated embodiments, clamp 24 may be activated and closed by turning one or more manual or remotely operable clamp bolts actuators, such as 54 (see FIG. 2, FIG. 5, FIG. 6A and FIG. 6B) In one embodiment, rotation of bolt(s) 54 in a single direction may advance opposing sides of clamp 24 toward swivel coupling element 16. FIG. 1B, FIG. 5, and FIG. 6B show clamp 24 in a closed position according to one embodiment. As may be seen, an upper portion 43 (see FIG. 18) of clamp 24 may matingly engage grip 18 while a lower portion 41 (see FIG. 1B) of clamp 24 may matingly engage clamping recess 36 (see FIG. 5). More particularly and with reference to FIG. 7, portions 112*a* and 114*a* of clamp 24 may engage portions 112*b* of grip 18 and portion 114*b* of hub 30, respectively. In a closed position, clamp 24 may force grip 18 downward and inward and hub 30 upward and inward by virtue of those elements' corresponding shapes. Clamp 24 may exert forces along sides of grip 18, ball nose 20, and hub 30 directed towards seal 22. Thus, clamp 24, by closing about swivel coupling element 16, may generate forces encompassing elements near and surrounding seal 22 so that seal 22 may be brought into sealing association with sealing surface 32. More particularly, those forces may create a metal-to-metal seal that may join first line 12 to second line 14.

FIGS. 11–15 illustrate an installation sequence according to one embodiment of presently disclosed method and apparatus. In FIG. 11, a jumper pipe 68, having two remote articulated connector apparatuses 10 coupled to its ends, is lowered during a final approach. In conventional connection methods, the main critical dimensions that will ensure a successful landing is the distance between seals of connectors, and the respective angular orientations. However, because remote articulated connectors 10 of the disclosed apparatus may tolerate a certain degree of angular misalignment (see FIG. 9A and FIG. 9B), angular measurements associated with two fixed lines, here lines 91 and 93, become less critical. This feature eliminates, or significantly reduces, the critical nature of angular alignment and may therefore advantageously provide for a significantly less expensive, simpler, method and apparatus for connecting one or more lines subsea as described herein.

Figure 12:
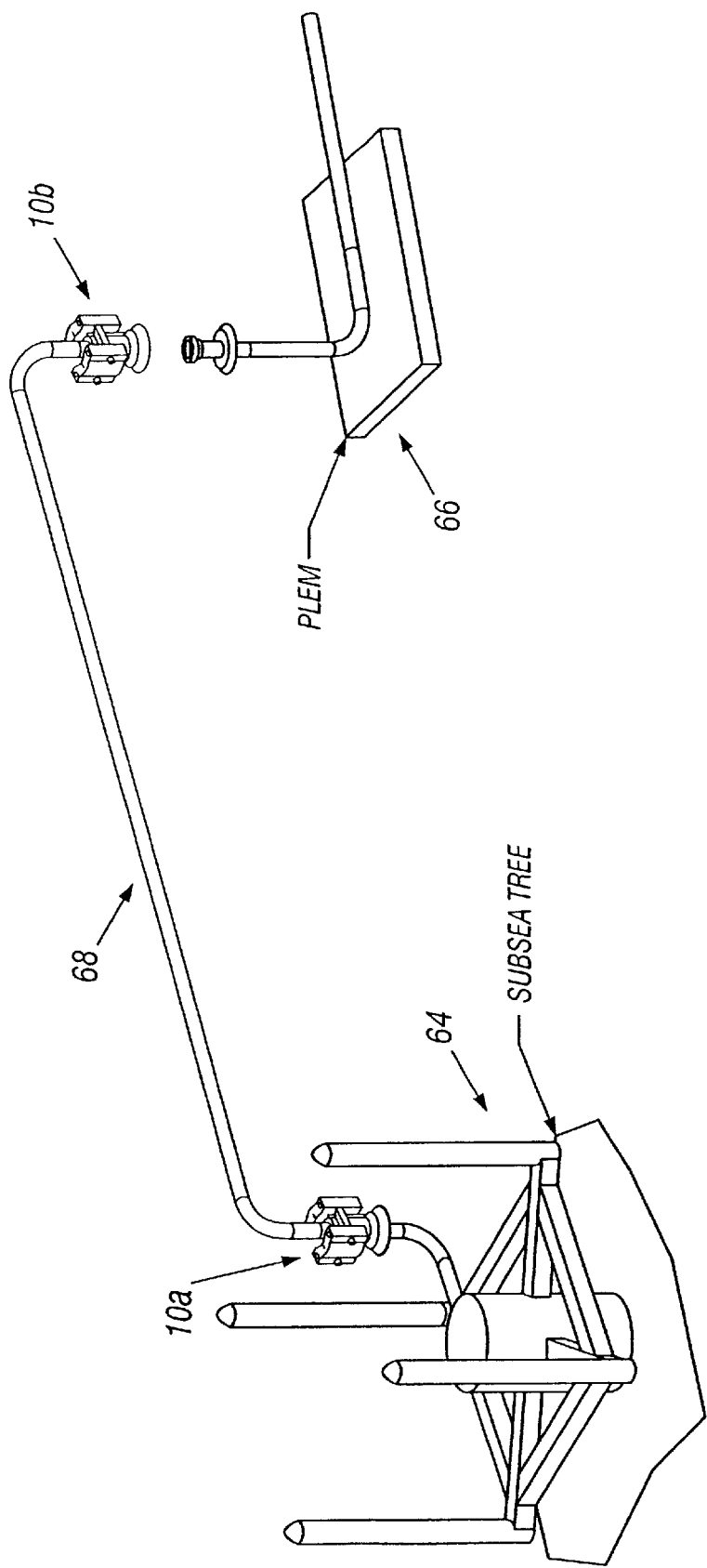
FIG. 12 is a schematic view of another step of an installation sequence according to one embodiment of the presently disclosed method and apparatus.
Figure 13:
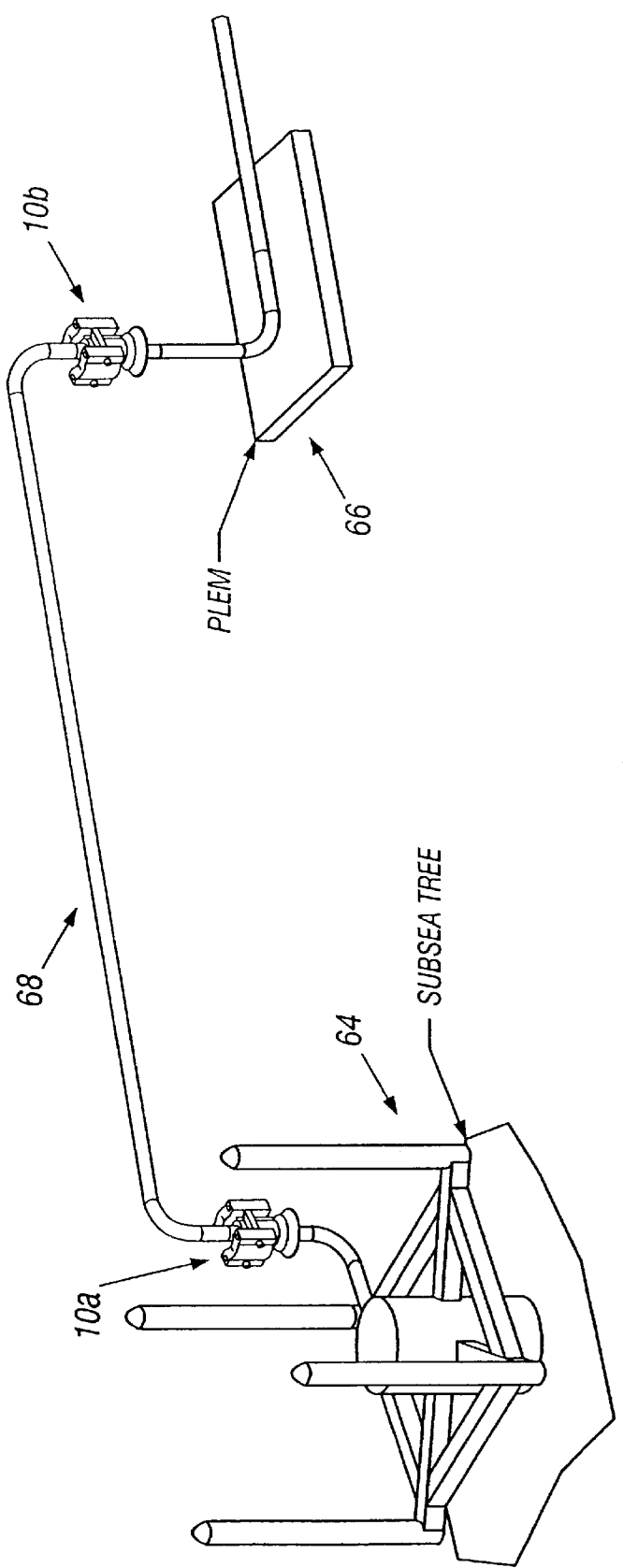
FIG. 13 is a schematic illustration of another step of an installation sequence according to one embodiment of the presently disclosed method and apparatus.

FIGS. 12 and 13 demonstrate an installation sequence according to one embodiment. A remote articulated connector apparatus 10*a* may be hard landed while another articulated connector apparatus 10*b* has not yet landed. Articulated connector 10*b* may then be hard landed. Articulated connector apparatus 10*a* may then be soft landed, locked (i.e., clamped), and sealed according to the disclosure herein. Articulated connector apparatus 10*b* may then be soft landed, locked (i.e., clamped), and sealed according to the disclosure herein. In another embodiment, the two articulated connectors 10 may each be hard landed. Apparatus 10*a* may then be soft landed followed by the soft landing of apparatus 10*b*. Apparatus 10*a* may then be locked followed by the locking of apparatus 10*b*. Apparatus 10*a* may be sealed followed by the sealing of apparatus 10*b*. With the benefit of the present disclosure, those having skill in the art will understand that installation sequences may be varied in many other ways. It will also be understood that installation may include annulus testing according to the embodiment illustrated in FIG. 10.

In all the embodiments described herein, it has been contemplated that, although not necessary, installation may be assisted with one or more divers. Thus, one or more divers may assist in the lowering of one or more remote articulated connectors 10, and one or more divers may, for instance, manually advance one or more clamp actuators to activate and close clamp 24 about swivel coupling element 16. Because the presently disclosed method and apparatus may significantly reduce costs associated with, for instance, installation, one may be able to afford the services of divers, although the presently disclosed methods and apparatus do not require such services.

Figure 14:
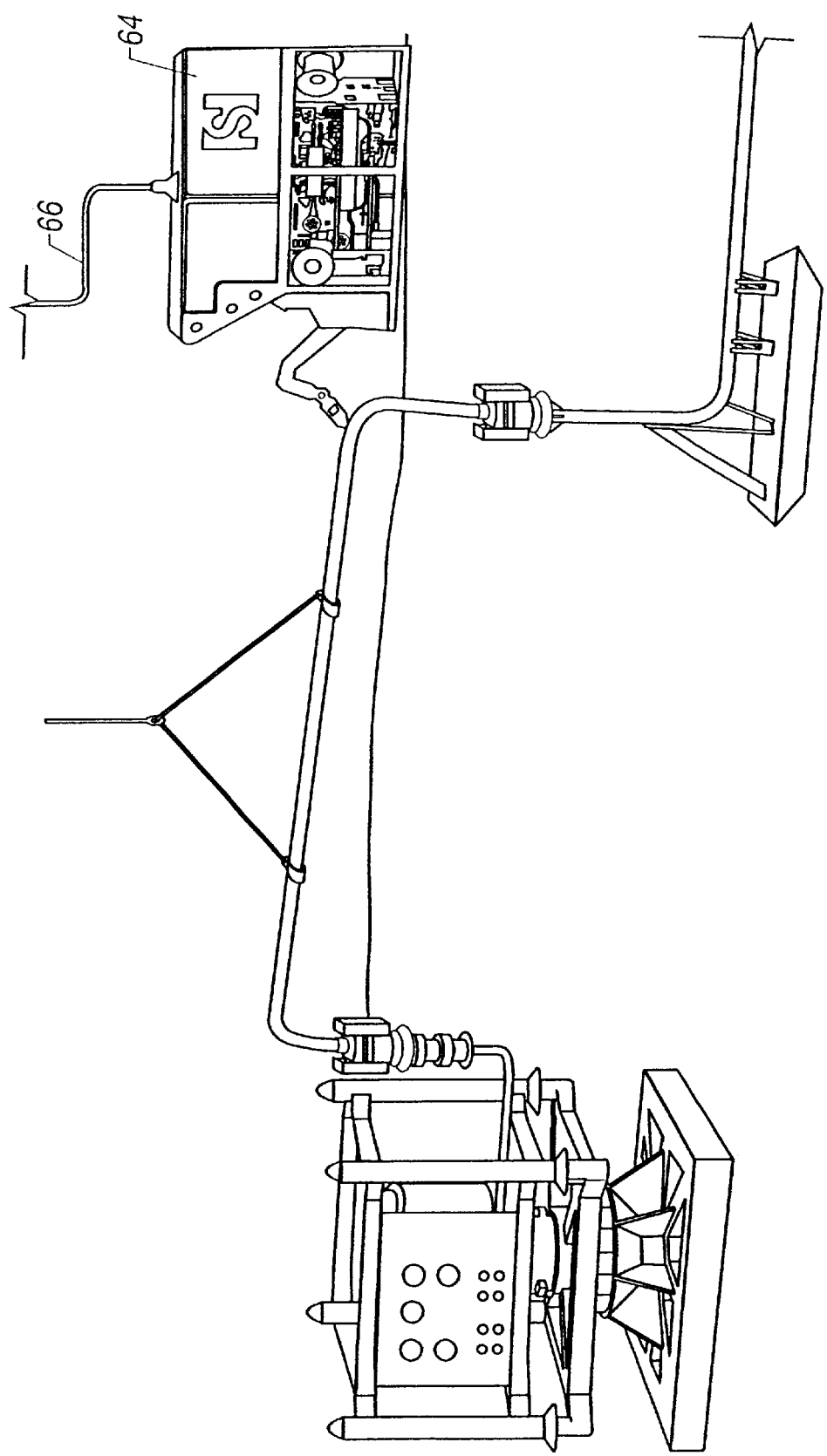
FIG. 14 illustrates the use of a remotely operated vehicle in conjunction with a connector apparatus according to one embodiment of the presently disclosed method and apparatus.

Installation figures, including FIGS. 11–15 illustrate that embodiments described herein may operate without the assistance of divers and may use one or more remotely operated vehicles (ROV) 64 to perform one or more of the installation steps described above. FIG. 14 illustrates that remotely operated vehicle 64 may lower a first line onto a second line to, for instance, hard land, soft land, and/or seat a seal. In illustrated embodiments, remotely operated vehicle 64 may be any remotely operated vehicle known in the art, and more particularly, any work-class ROV with manipulators suitable to complete the installation as described herein. In one embodiment, vehicle 64 may be a Perry Tritech (Florida) Triton, Viper, or Scorpion ROV.

Figure 15:
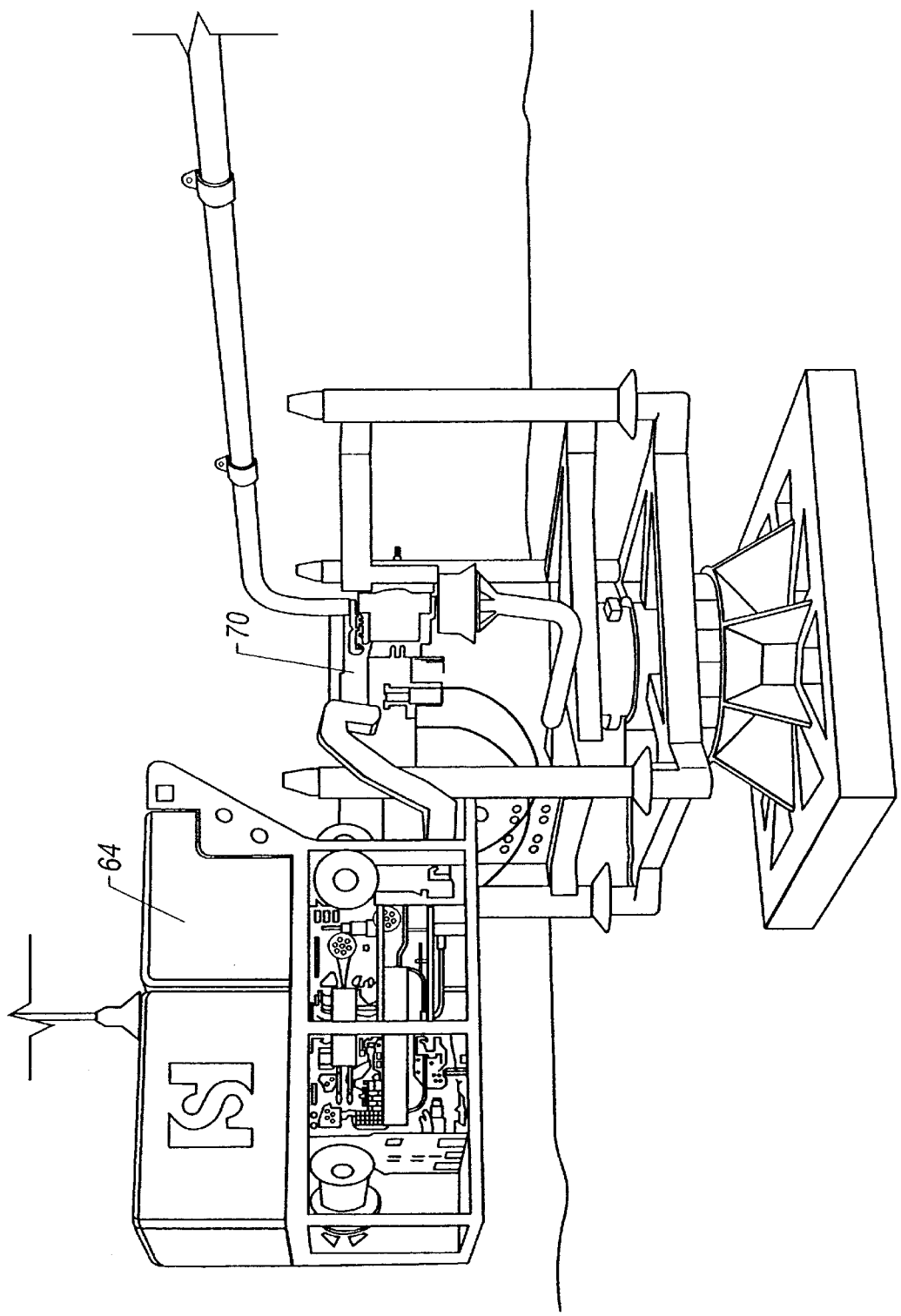
FIG. 15 shows a three dimensional view of a remotely operated vehicle activating a clamp of a connector apparatus according to one embodiment of the presently disclosed method and apparatus.
Figure 16:
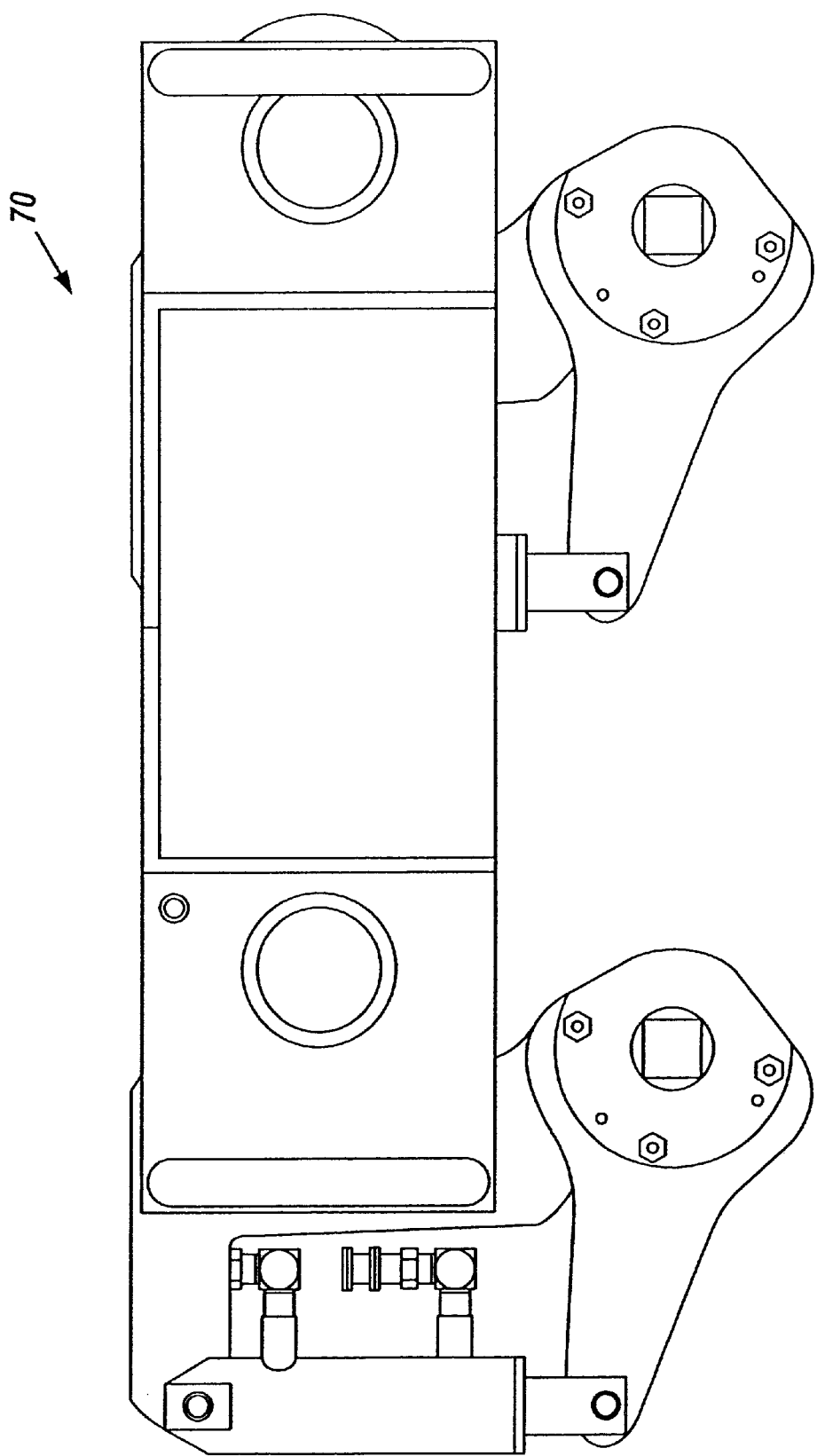
FIG. 16 shows a torque tool utilized in one embodiment of the presently disclosed method and apparatus.

FIG. 15 demonstrates that remotely operated vehicle 64 may activate and close clamp 24 without the assistance of divers via, for instance, a torque make-up tool 70, which is shown in more detail in FIG. 16. In other embodiments, vehicle 64 may utilize any tool suitable for activating clamp actuators, such as bolt 52. For instance, a hydraulic torque wrench, a bolt tensioner, or a general-purpose torquing device may be employed.

Figure 19:
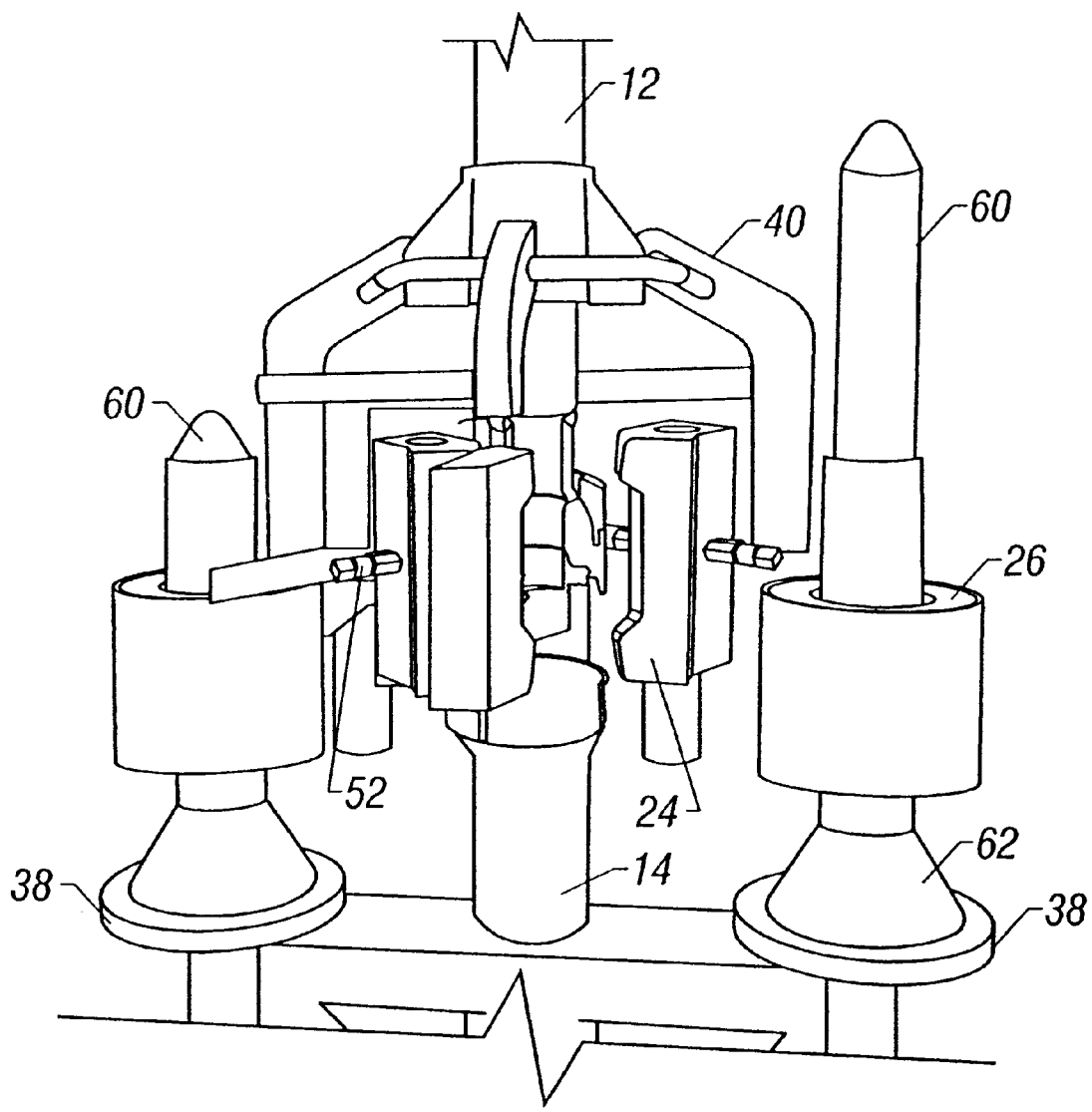
FIG. 19 is a three dimensional view of a remote articulated connector according to one embodiment of the presently disclosed method and apparatus.

While the present disclosure may be adaptable to various modifications and alternative forms, specific embodiments have been shown by way of example and described herein. However, it should be understood that the present disclosure is not intended to be limited to the particular forms disclosed. Rather, it is to cover all modifications, equivalents, and alternatives falling within the spirit and scope of the disclosure as defined by the appended claims. For instance, the disclosed apparatus may utilize one or more guide pins 60 that may engage one or more guide cones 62 that may engage one or more landing bases 38, as illustrated in FIG. 19. Such an embodiment may utilize one or more soft landing bodies 26 that may slidably engage an upper portion of the one more guide cones 62, as illustrated. In the embodiment of FIG. 19, support structure 40 may be coupled to guide pins 60. Additionally, although the illustrated embodiments have shown active connector 50 coupled to first line 12, it is contemplated that in other embodiments active connector 50 may be coupled to second line 14. Likewise, it is contemplated that a line coupled to active connector 50 may be fixed or may be moveable. In other embodiments, active connector 50 may form a connection when two lines are arranged vertically, horizontally, or at any other angle relative to one another.

Specific examples of just a few other possible embodiments of the disclosed apparatus and method include use in conjunction or cooperation with connector systems and components such as those described in U.S. Pat. Nos. 4,886,300, 4,530,526, 4,618,173, 4,381,871, 4,153,281, 4,477,105, 5,468,023, each of which is incorporated herein by reference, in its entirety.

Moreover, the different aspects of the disclosed apparatus and methods may be utilized in various combinations and/or independently. Thus the invention is not limited to only those combinations shown herein, but rather may include other combinations. Those of skill in the art will understand that numerous other modifications may be made to the disclosed method and apparatus, but all such similar substitutes and modifications are deemed to be within the spirit, scope and concept of the invention as defined by the appended claims.

REFERENCES

The following references, to the extent that they provide exemplary procedural or other details supplementary to those set forth herein, are specifically incorporated herein by reference in their entirety.

U.S. Pat. No. 4,153,281
U.S. Pat. No. 4,381,871
U.S. Pat. No. 4,477,105
U.S. Pat. No. 4,530,526
U.S. Pat. No. 4,618,173
U.S. Pat. No. 4,886,300
U.S. Pat. No. 5,468,023

What is claimed is:

1. A connector apparatus for connecting a first line to a second line, comprising:
    a hub adapted to be coupled to said second line;
    a sealing surface coupled to said hub;
    a seal adapted to be coupled to said first line;
    an alignment lip coupled to said hub and configured to protect said seal and to guide said seal into mating engagement with said sealing surface;
    a clamp configured to close about said hub to draw together said seal and said sealing surface into sealing contact to connect said first line to said second line;
    a support structure coupled to said clamp; and
    a bolt coupling said support structure and said clamp, wherein said bolt is operable to close said clamp.

2. The connector apparatus of claim 1, further comprising a ball nose coupled to the seal and configured to engage said alignment lip.

3. The connector apparatus of claim 2, further comprising a swivel coupling element for coupling the ball nose to the first line and permitting rotational and articulating motion of the ball nose with respect to the first line, wherein said rotational motion is 360 degrees and wherein said articulating motion is about twenty degrees or less relative to said first line.

4. The connector apparatus of claim 2, further comprising an annulus testing port defined in said ball nose.

5. The connector apparatus of claim 1, further comprising:
    a soft landing body configured in operative relation to said seal;
    an alignment cone slidably coupled to said soft landing body;
    a landing base adapted to be coupled to said second line and configured to receive said alignment cone;
    wherein said alignment cone is configured to align said seal with said sealing surface by passing over an outer surface of said hub; and
    wherein said soft landing body is configured to slide in relation to said alignment cone to guide said seal into seating alignment with said sealing surface.

6. The connector apparatus of claim 1, wherein said hub comprises a clamping recess configured to mate with said clamp upon closure of said clamp.

7. The connector apparatus of claim 1, wherein said sealing surface is recessed.

8. The connector apparatus of claim 1, wherein said seal comprises a ribbed metal seal.

9. The connector apparatus of claim 1, further comprising one or more guide pins and one or more guide cones in operative relation with said seal, said one or more guide pins configured to engage said one or more guide cones to guide said first line towards said second line.

10. The apparatus of claim 1, wherein said sealing surface is defined by said hub.

11. The apparatus of claim 1, wherein said alignment lip is defined by said hub.

12. A method for connecting a first line to a second line, comprising:
    providing an active connector coupled to said first line and comprising a seal; a clamp configured in operative relation with said seal; a soft landing body configured in operative relation with said seal; and an alignment cone slidably coupled to said soft landing body;
    providing a hub assembly coupled to said second line and comprising a hub; a sealing surface; a clamping recess defined by said hub; and a landing base configured in operative relation to said hub;
    positioning said active connector adjacent said hub assembly;
    hard landing said active connector by passing said alignment cone over an outer surface of said hub to engage said landing base;
    soft landing said active connector onto said hub assembly by sliding said soft landing body relative to said alignment cone in a direction toward said landing base; and
    seating said seal into mating engagement with said sealing surface;
    activating said clamp to draw together said seal and said sealing surface into sealing relationship to connect said first line to said second line.

13. The method of claim 12, wherein a remotely operated vehicle performs said positioning, said hard landing, said soft landing, said seating, said activating or any combination thereof.

14. The method of claim 12, wherein said active connector further comprises an annulus testing port configured in operative relation with said seal, and wherein said method further comprises annulus testing said seal.

* * * * *